(12) United States Patent
Oattes

(10) Patent No.: US 12,282,477 B2
(45) Date of Patent: Apr. 22, 2025

(54) METHOD FOR IMPLEMENTING DATA TRIPLESTORE OVER A CLOUD ANALYTICAL DATA STORE

(71) Applicant: Kobai, Inc., San Ramon, CA (US)

(72) Inventor: Ryan Oattes, Burlington (CA)

(73) Assignee: Kobai, Inc., San Ramon, CA (US)

( * ) Notice: Subject to any disclaimer, the term of this patent is extended or adjusted under 35 U.S.C. 154(b) by 0 days.

(21) Appl. No.: 18/142,823

(22) Filed: May 3, 2023

(65) Prior Publication Data

US 2023/0359614 A1    Nov. 9, 2023

Related U.S. Application Data

(60) Provisional application No. 63/337,788, filed on May 3, 2022.

(51) Int. Cl.
G06F 16/24 (2019.01)
G06F 16/21 (2019.01)
G06F 16/22 (2019.01)
G06F 16/242 (2019.01)

(52) U.S. Cl.
CPC ........ *G06F 16/2433* (2019.01); *G06F 16/211* (2019.01); *G06F 16/221* (2019.01)

(58) Field of Classification Search
CPC .. G06F 16/2433; G06F 16/211; G06F 16/221; G06F 16/2452
See application file for complete search history.

(56) References Cited

U.S. PATENT DOCUMENTS

| | | | |
|---|---|---|---|
| 2012/0102022 A1 | 4/2012 | Miranker et al. | |
| 2012/0150922 A1 | 6/2012 | Yalamanchi et al. | |
| 2018/0314737 A1 | 11/2018 | Chong | |
| 2020/0081700 A1* | 3/2020 | Zhao | H04L 67/10 |
| 2020/0267175 A1* | 8/2020 | Atighetchi | H04L 63/20 |
| 2021/0334756 A1* | 10/2021 | Copeland | G06F 40/186 |

FOREIGN PATENT DOCUMENTS

WO    9703406 A1    1/1997

* cited by examiner

*Primary Examiner* — Etienne P Leroux
*Assistant Examiner* — Cindy Nguyen
(74) *Attorney, Agent, or Firm* — Haley Guiliano LLP

(57) ABSTRACT

Systems and methods are disclosed for processing data. The system represents semantic data in the semantic data storage using a schema native to Cloud Analytical Data Store (CADS) based on data defining a semantic model. The system modifies the schema based on a detected change in the semantic model. The system writes semantic data into the CADS, wherein the semantic data is formatted according to the schema using at least one of: (a) bulk load, or (b) a sequence of write requests. The system receives a semantic query. The system translates the semantic query into a translated query in a CADS-native format, wherein the translated query is formatted according to the schema. The system causes the CADS to provide an answer to the translated query based on data contained in the CADS.

18 Claims, 16 Drawing Sheets

CADS Scheme 500

Table Concept 1

502

| Instance ID | Property 1 | Property 2 | ... | Property N |
|---|---|---|---|---|
| | | | | |
| | | | | |
| | | | | |
| | | | | |

Table Concept 2

504

| Instance ID | Property 1 | Property 2 | ... | Property N |
|---|---|---|---|---|
| | | | | |
| | | | | |
| | | | | |
| | | | | |

⋮

Table Concept 3

506

| Instance ID | Property 1 | Property 2 | ... | Property N |
|---|---|---|---|---|
| | | | | |
| | | | | |
| | | | | |
| | | | | |

FIG. 5

Graph Data 800

| Subject | Predicate | Object |
|---|---|---|
| Downtown | A | School |
| Downtown | City | Toronto |
| T456 | A | Teacher |
| T456 | Name | Smith |
| T456 | Works at | Downtown |
| T456 | Works at | Uptown |
| • | | |
| • | | |
| • | | |
| S3 | A | Student |
| S3 | Name | Ryan |
| s3 | Age | 10 |
| | | |
| | | |

Student 902 → Graph Data 900

| ID | Age | Name | Grade | Taught By |
|---|---|---|---|---|
| S4 | 10 | Steve | 4 | (T654) |
| S3 | 13 | Ryan | 8 | (T678,T654) |
| | | | | |
| | | | | |

Teacher 914

| ID | Name | Class | Teaches At |
|---|---|---|---|
| T456 | Snell | French | Downtown, Uptown |
| T654 | Matthews | English | Uptown |
| | | | |
| | | | |

School 924

| School | Name | City |
|---|---|---|
| Downtown | Downtown | Toronto |
| Uptown | Uptown | Toronto |
| | | |
| | | |

Table Concept 1 (1002)

| Instance ID (1004) | Property ID (1006) | Property Value (1008) |
|---|---|---|
| S4 | Age | 10 |
| s3 | Taught By | T678 |
| s3 | Taught By | T654 |
|  |  |  |

⋮

Table Concept N (1010)

| Instance ID (1012) | Property ID (1014) | Property Value (1016) |
|---|---|---|
| T678 | Name | Snell |
| T678 | Class | French |
|  |  |  |
|  |  |  |

FIG. 10

Student

| ID | Property | Value |
|---|---|---|
| S4 | Age | 10 |
| S4 | Name | Steve |
| S4 | Grader | T678 |
| s4 | Taught By | T654 |

Teacher

| ID | Property | Value |
|---|---|---|
| T456 | Name | Snell |
| T456 | Class | French |
| T456 | Works at | Downtown |
| T654 | Name | Matthews |

Student Relations

| ID | Relation | Value |
|---|---|---|
| S4 | Taught By | T647 |
| S4 | Taught By | T654 |
|  |  |  |
|  |  |  |

1210

Student Properties

| ID | Prop ID | Value |
|---|---|---|
| S4 | Age | 10 |
| S4 | Name | Steve |
| S4 | Garde | 4 |
|  |  |  |

FIG. 12

METHOD FOR IMPLEMENTING DATA TRIPLESTORE OVER A CLOUD ANALYTICAL DATA STORE

CROSS-REFERENCE TO RELATED APPLICATIONS

This application claims the benefit of the filing date of United States Provisional Application 63/337,788 filed May 3, 2022, the disclosure of which is incorporated by reference herein.

BACKGROUND

The present disclosure relates to methods and systems for storing and processing triple store semantic data in Cloud Data Warehouses and Cloud Data Lakehouses for access by semantic queries.

SUMMARY

One approach to storing data is to store in a form of a Knowledge Graph. Knowledge Graphs can be represented using triple store data structures. For example, Resource Description Framework (RDF), further described RDF 1.1 Concepts and Abstract Syntax, W3C Recommendation 25 Feb. 2014 (which is herein incorporated by reference) may be used to represent triple store data. For example, triple store data structures can rely on (subject, predicted, object) data format to store data. This document will refer to triple store data, but one skilled in the art would appreciate that other suitable types of triple store (e.g., not compliant with RDF) can also be used instead of RDF data structures.

Knowledge Graph technology has the potential to implement Data Fabrics to increase the value of Machine Learning (ML) and Artificial Intelligence analytics. However, current triple store technology lacks the scalability of both storage volume and compute performance to realize this opportunity. To address this problem, system and methods are described below implement a triple store with querying capabilities (e.g., triple store querying capabilities over top of Cloud Analytical Data Store (CADS) technology (including Cloud Data Warehouses and Cloud Data Lakehouses), efficiently solving the compute and storage limitations of Knowledge Graph storage. One example of triple store querying language is SPARQL Protocol and RDF Query Language (SPARQL) querying which is standardized language typically used for querying RDF store, however any other suitable language for querying the triple store may be used. SPARQL queries are further described by SPARQL Query Language for RDF, W3C Recommendation 15 Jan. 2008 (which is herein incorporated by reference).

Additionally methods are provided to provide an additional benefit of "native access" where data organized via the Knowledge Graph can be queried using the query language native to the CADS which may be higher performance than service-based triple store queries and allows integration into non-semantic tool chains (e.g., Structured Query Language (SQL)-based Extract, transform, and load (ETL) and Spark-based Data frame manipulation). Some exemplary systems described herein that implementing these methods provide the additional benefit of "dual use" capability of data, to serve both BI (Business Intelligence) and ML/AI use cases from a single Knowledge Graph implementation.

Methods described herein are implemented to be used on the triple-store level of Semantic Web Stack. Sematic web stack is further described by "About: Semantic Web Stack," DBpedia, accessed on Apr. 30, 2023, (which is herein incorporated by reference). Typically, triple store data (e.g., RDS) that allows for sematic searches (e.g., via SPARQL) cannot be scaled due to limitations of triple store stores (e.g., single node). The methods described herein are capable of creation of triple store storage schema over existing CADS services to leverage their multi-node on demand capability and increases computation capacity. In particular CADS may leverage tabular format of data supplemented with statistical metadata that allows for use of query planners to improve performance on demand. CADS also offer Clustering, Micro-Partitioning and Query Pruning that speed up performance.

The term Data Lake—is used herein to refer to a system capable of storing structured (tables/rows/columns), semi-structured (logs, JSON), or unstructured (images, documents) data, at any scale. Also known as object- or blob stores, data lakes may store data as files with minimal associated metadata.

The term Data Warehouse—is used herein to refer to a system designed to facilitate analysis of large quantities of structured data, typically by extracting data from a variety of source systems and transforming it to facilitate future query requirements either before or after it is loaded into the warehouse. These warehouses have feature differences in relation to common "transactional" relational databases, most warehouses may support large scale storage, high performance, and scalable compute. In one approach, data warehouses may be provided as cloud services, and use techniques such as micro-partitioning, query pruning, and clustering to provide highly scalable performance on clusters of commodity hardware. Cloud data warehouses also may have the capability to leverage data lake object stores for storage.

The term Data Lakehouse—is used herein to refer to combination of data warehouse capabilities (scalable structured analysis) with the economy and flexibility (of access patterns) of data lakes. In some approaches, data Lakehouses require a system for specifying governing metadata over stored objects for transaction control, etc. Using this metadata allows query engines to run structured queries over object files while preserving the capability to interact with semi-structured or unstructured data. By facilitating the structured query patterns typically fulfilled by data warehouses, date Lakehouses allow a single system to provide "dual use" capability supporting both Business Intelligence (SQL) and Data Science (ML/AI) workloads.

The term Cloud Analytical Data store—may be used here to refer to storage systems allowing structured queries over scalable storage using scalable compute. This category includes Data Warehouses and Data Lakehouses as described above, as well as various query virtualization technologies, and scalable databases.

The term Data Fabric—may be used here to refer to complete integration of all the data of an organization or enterprise, such that queries can effectively combine data from different business domains and divisions.

To overcome challenges of typical storage of triple store data, methods and systems are provided herein that provided an ability to store typical triple store (e.g., RDF) data in CADS system that includes both storage and compute for table-based data to facilitate triple store query-based language queries over data stored in CADS.

In some embodiments, the methods may be implemented by a Data Processing application (DPA) that may be executing (based on instructions stored in non-transitory memory)

on one or more serves clients, any other suitable computing device, or any combination thereof.

In some approaches, the DPA represents semantic data in the semantic data storage using a schema native to Cloud Analytical Data Store (CADS) based on data defining a semantic model. The DPA further modifies the schema based on a detected change in the semantic model. After the modifications, the DPA writes semantic data into the CADS, where the data is formatted according to the schema using at least one of: (a) bulk load, or (b) a sequence of write requests. After the formatted data is stored, the DPA may receive a semantic query. The DPA translates the semantic query into a translated query in a CADS-native format, wherein the translated query is formatted according to the schema. The DPA than causes the CADS to provide an answer to the translated query based on data contained in the CADS.

In some implementations, the CADS may comprise a compute portion (e.g., processing circuitry for handling queries, e.g., by executing the DPA as discussed above and below) and a data store portion (e.g., for storing data in a plurality of tables in non-transitory memory as describe above and below). In such implementations, the DPA causes the compute portion of CADS to provide the answer based on data contained in the data store portion of the CADS based on the translated semantic query.

The semantic data storage may be a triple store storage (e.g., RDS storage). In this example, the semantic query may be a SPARQL Protocol and RDF Query Language (SPARQL) query.

In some embodiments, the DPA, later, receives a second semantic query. The DPA translates the second semantic query into a second translated query in a CADS-native format, wherein the second translated query is formatted according to the schema. The DPA publishes the second translated semantic query as a tabular object native to the CADS data storage. The DPA than provides an interface that allows for running the second translated semantic query over the CADS data storage.

In some embodiments, the schema may be either a narrow strategy schema or a wide strategy schema, wherein the type of schema is selected based on metadata of the CADS data storage and/or based on optimization methods native to the CADS data storage. In some embodiments, the schema may comprise at least one of clustering or segmenting strategy.

When the schema is the wide schema, each concept in the semantic model is represented by a unique table, wherein the table comprises multiple columns, each column being associated with a different property for a concept instance ID. For example, one column of the multiple columns may include an identifier for each instance of the concept, and other columns the multiple columns are associated with a different property of the concept.

When the schema is the narrow schema, each concept in the semantic model is represented by a unique table, wherein each of the unique tables comprises three columns. The first column comprises a concept instance identification (ID), the second column comprises a property name for the concept instance associated with the concept instance, and third column comprises a value associated with the property name and the concept instance id.

Such creation and maintenance of CADS by the DPA allows for efficient use of tabular storage for representing data normally stored by triple store data objects, while maintaining the ability to resolve triple store formatted queries (e.g., SPARQL queries) using compute capabilities of the CADS thus providing usability and computation use resource advantages over other approaches.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which:

FIG. 5 shows another exemplary diagram of CADS scheme, in accordance with some embodiments of the disclosure;

FIG. 8 shows an exemplary diagram of a graph data, in accordance with some embodiments of the disclosure;

FIG. 9 shows another exemplary diagram of a graph data, in accordance with some embodiments of the disclosure;

FIG. 10 shows an exemplary diagram for representing data in CADS, in accordance with some embodiments of the disclosure;

FIG. 11 shows another exemplary diagram for representing data in CADS, in accordance with some embodiments of the disclosure;

FIG. 12 shows another exemplary diagram for representing data in CADS, in accordance with some embodiments of the disclosure;

DETAILED DESCRIPTION

The current disclosure describes several techniques for enabling storage and utilization of triple store storage (e.g., RDF) over CADS. This would, for example, enable the use of data fabric and sematic stack to leverage advantages of tabular data storage while retaining search and query capabilities of triple store query languages.

Figure 1:
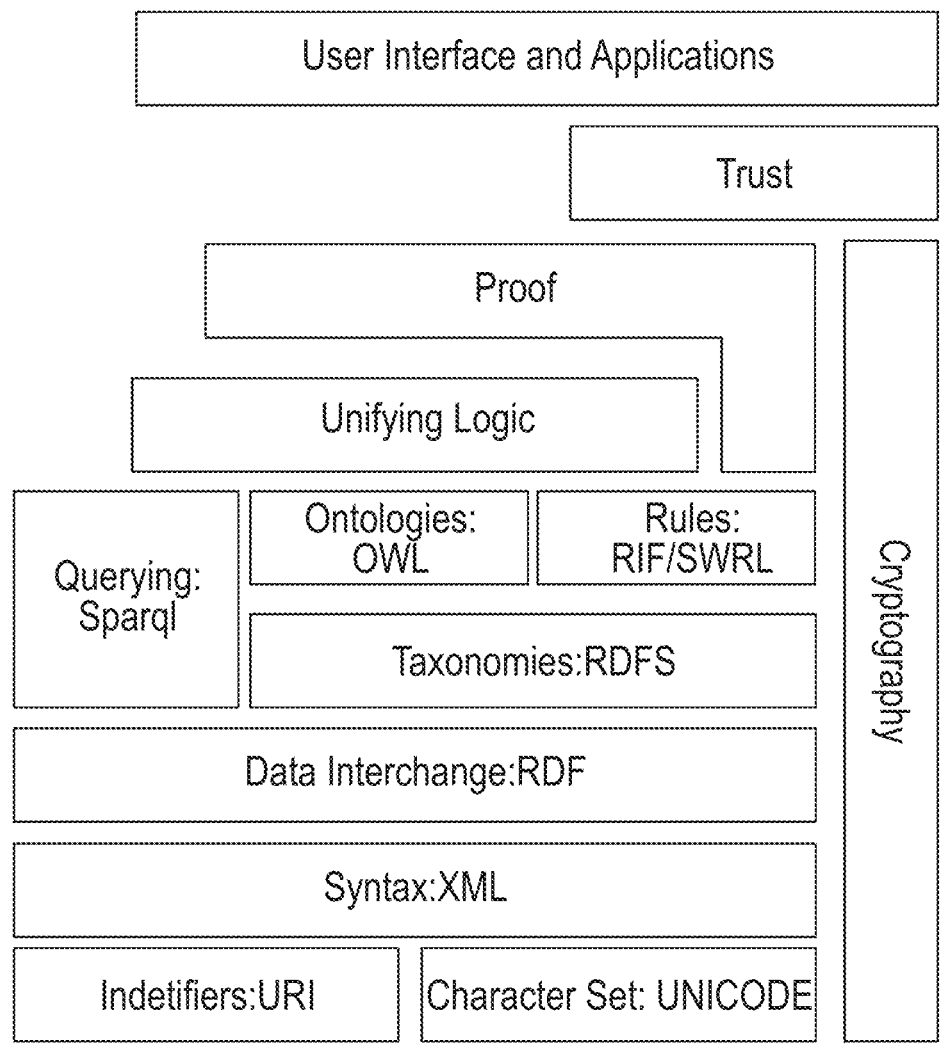
FIG. 1 shows an illustrative sematic web stack, in accordance with some embodiments of the disclosure.

FIG. 1 shows an illustrative sematic web stack 100, in accordance with some embodiments of the disclosure. For example, the top of the stack may be UI and interface for accessing the data. Lower on the stack, may be trust, proof and unifying logic modules. Lower on the stack, there may be querying capabilities (e.g., triples store query languages such as SPARQL), ontologies, rules, and taxonomies (e.g., triple store vocabulary, such as RDFS). The lower layer may be the data interchange (e.g., triple store such as RDF) with syntax (such as XML) using URI identifiers and character set (such as Unicode or ASCII). The lower layers may be secure with a suitable cryptographic implementation. In some embodiments, method and techniques described herein are implemented to be used on the triple-store level of Semantic Web Stack (e.g., in querying, taxonomies, and data interchange layers). The methods and techniques implemented below may utilize any triple store scheme and any suitable triple store query languages. While RDF and SPARQL may be shown as examples in some figures and described as examples below, one skilled in the art would understand that any suitable triple store scheme and any suitable triple store query language may be used instead.

Figure 2:
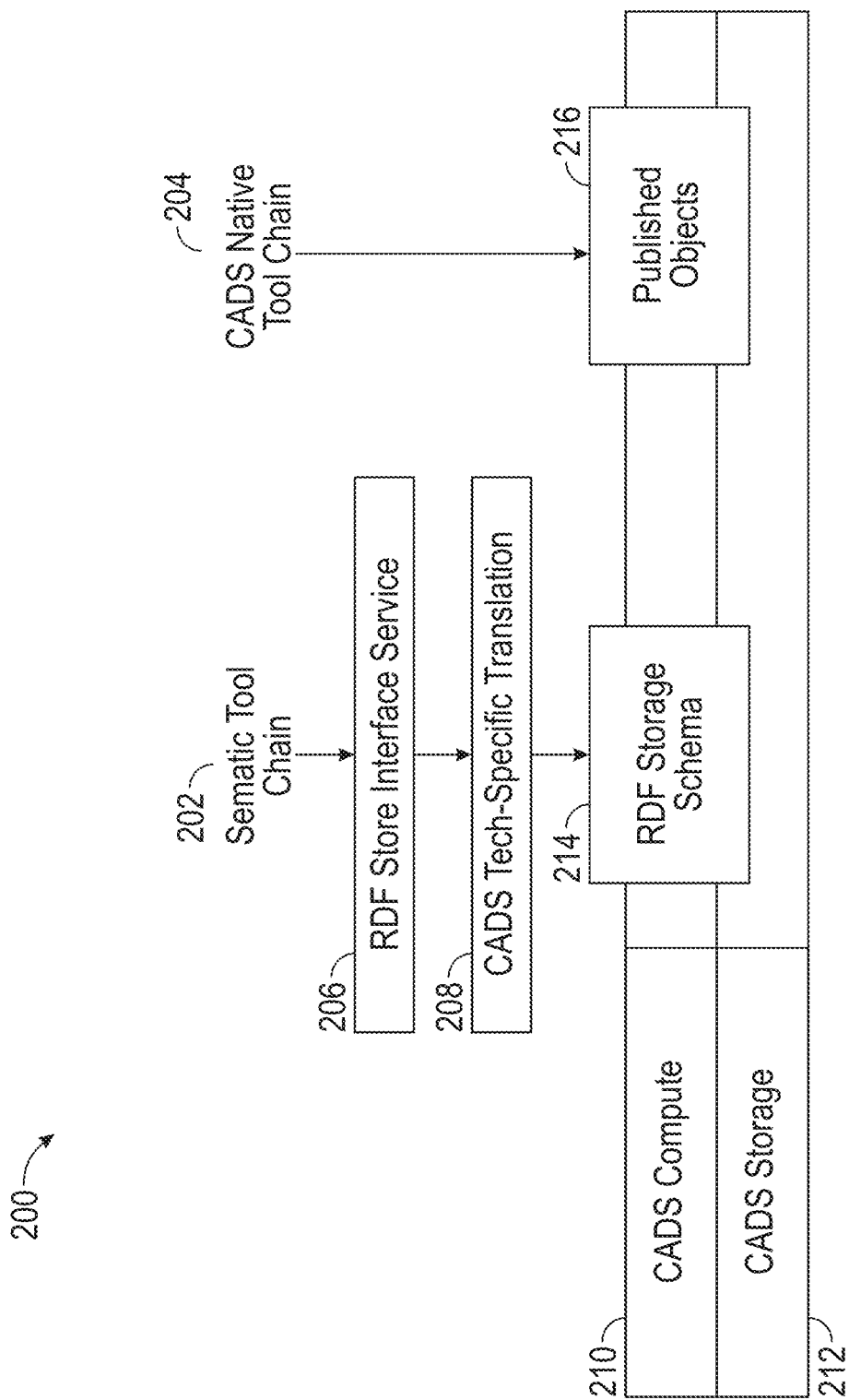
FIG. 2 shows illustrative implementation of Data Procession Application (DPA), in accordance with some embodiments of the disclosure.

FIG. 2 shows general architecture 200 for enabling storage and utilization of triple store (e.g., RDF) over CADS. As shown, CADS compute 210 and CADS storage 212 may be any suitable storage/computer systems (e.g., systems for storing and proofing compute operations over tabular data). The methods describe herein create a triple store storage scheme to store triples data over the native CADS storage system (e.g., over tabular format of the CADS). In this way any sematic tool chain tools 202 (e.g., RDF Storage Schema and Published Objects) may be used to access a triple store storage schema stored on top of CADS storage and leverage CADS computation capabilities.

In some approaches, to accomplish this, RDF storage schema 214 is created (e.g., using one or more techniques describe below) by the DPA. In addition, CADS Tech-Specific Translation tools 208 are provided by the DPA for interpreting commands provided via RDF Store Interface Service 206 to fulfill queries from the semantic tools chain 202 (e.g., SPARQL queries). Moreover, semantic tools chain 202 queries are translated by the DPA to native CADS format and stored as published objects 216 to be used by other systems of CADS. CADS native tool chain techniques 204 may be used to directly interact with the published objects.

Figure 3:
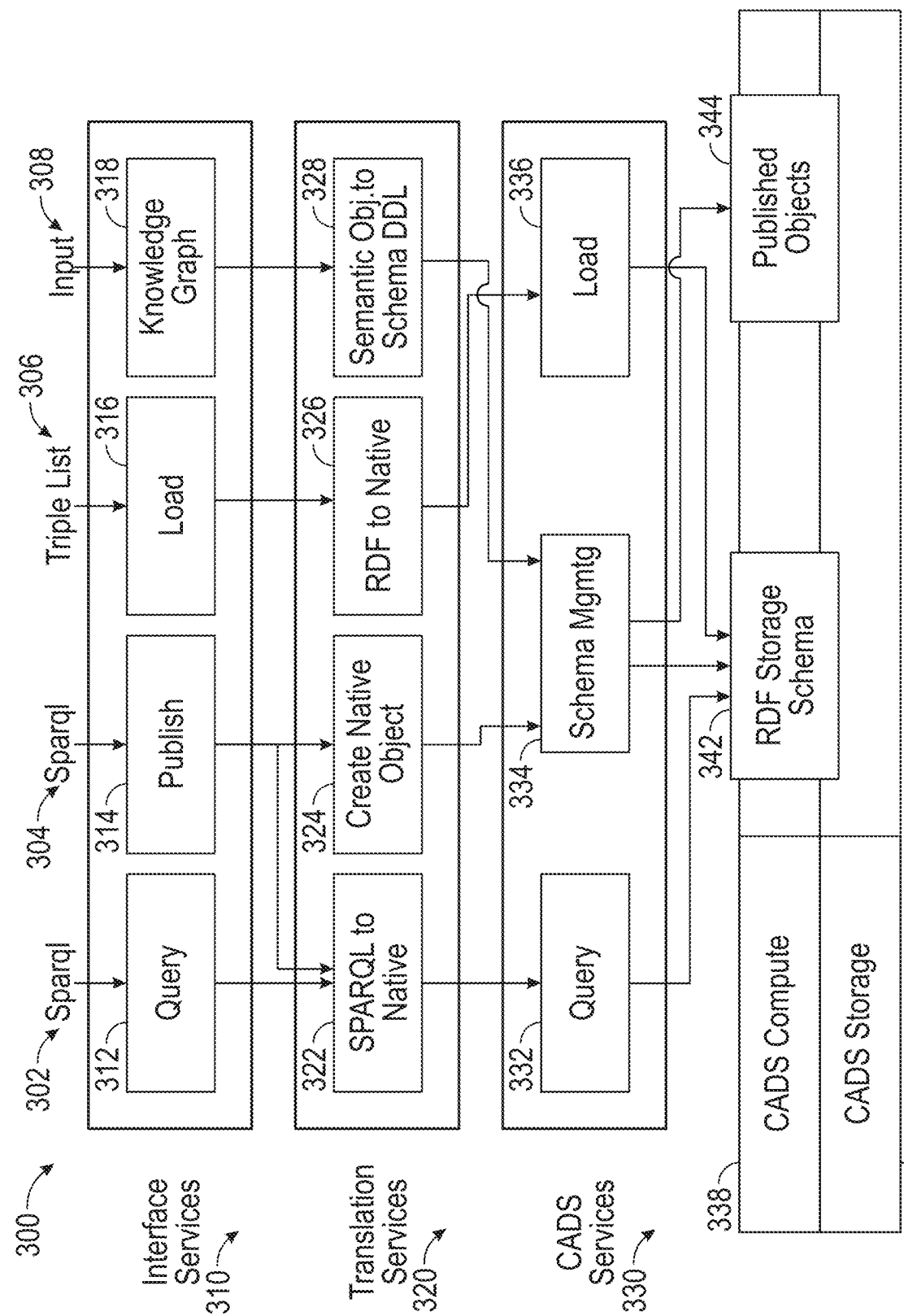
FIG. 3 shows another implementation of DPA, in accordance with some embodiments of the disclosure.

FIG. 3 shows a more detailed illustrative version of services described by FIG. 2. Similar to FIG. 2, RDF Storage Schema and Published Objects are created over CADS storage system with CADS computation capabilities.

Figure 6:
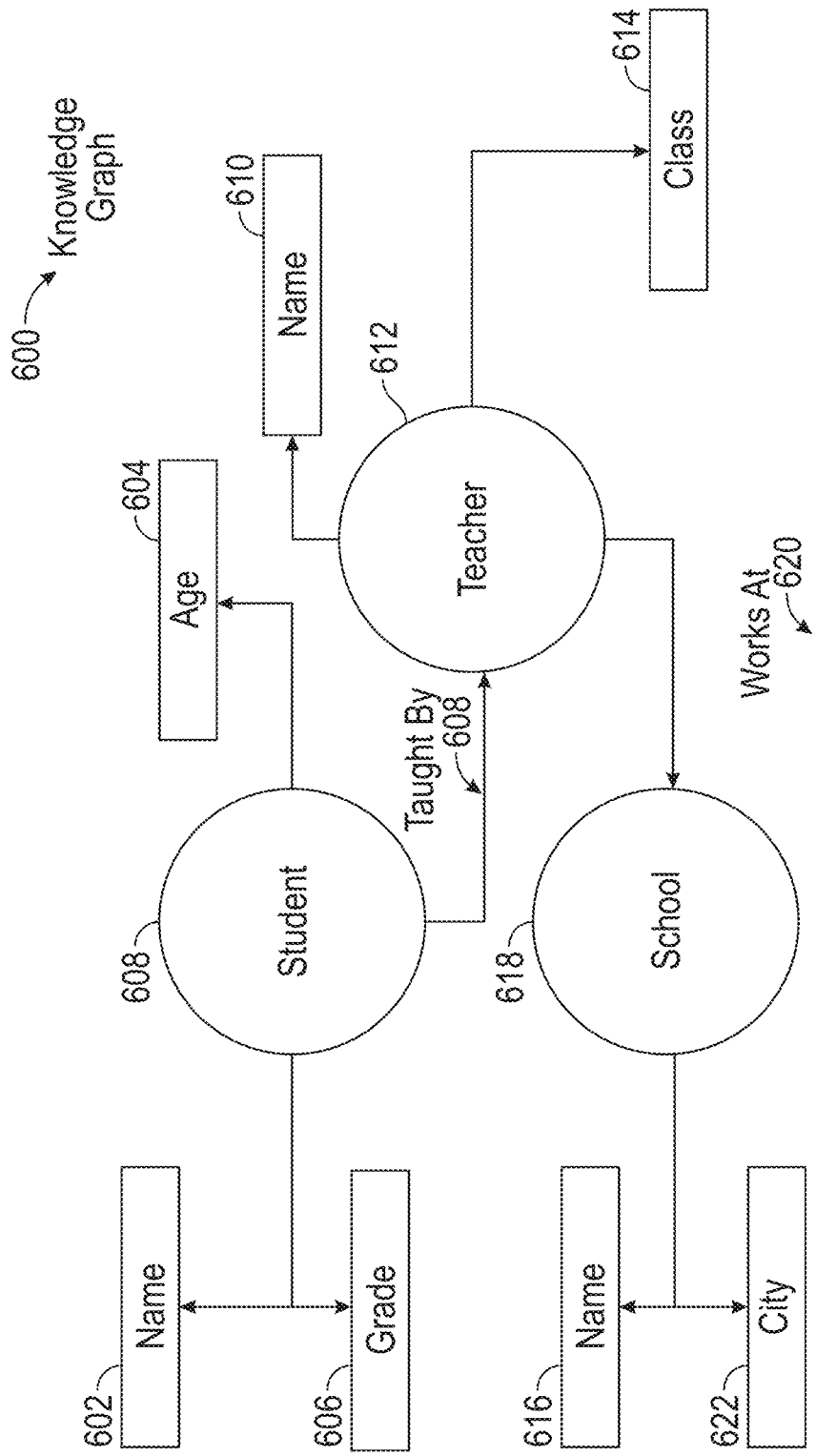
FIG. 6 shows an exemplary diagram of a knowledge graph, in accordance with some embodiments of the disclosure.
Figure 7:
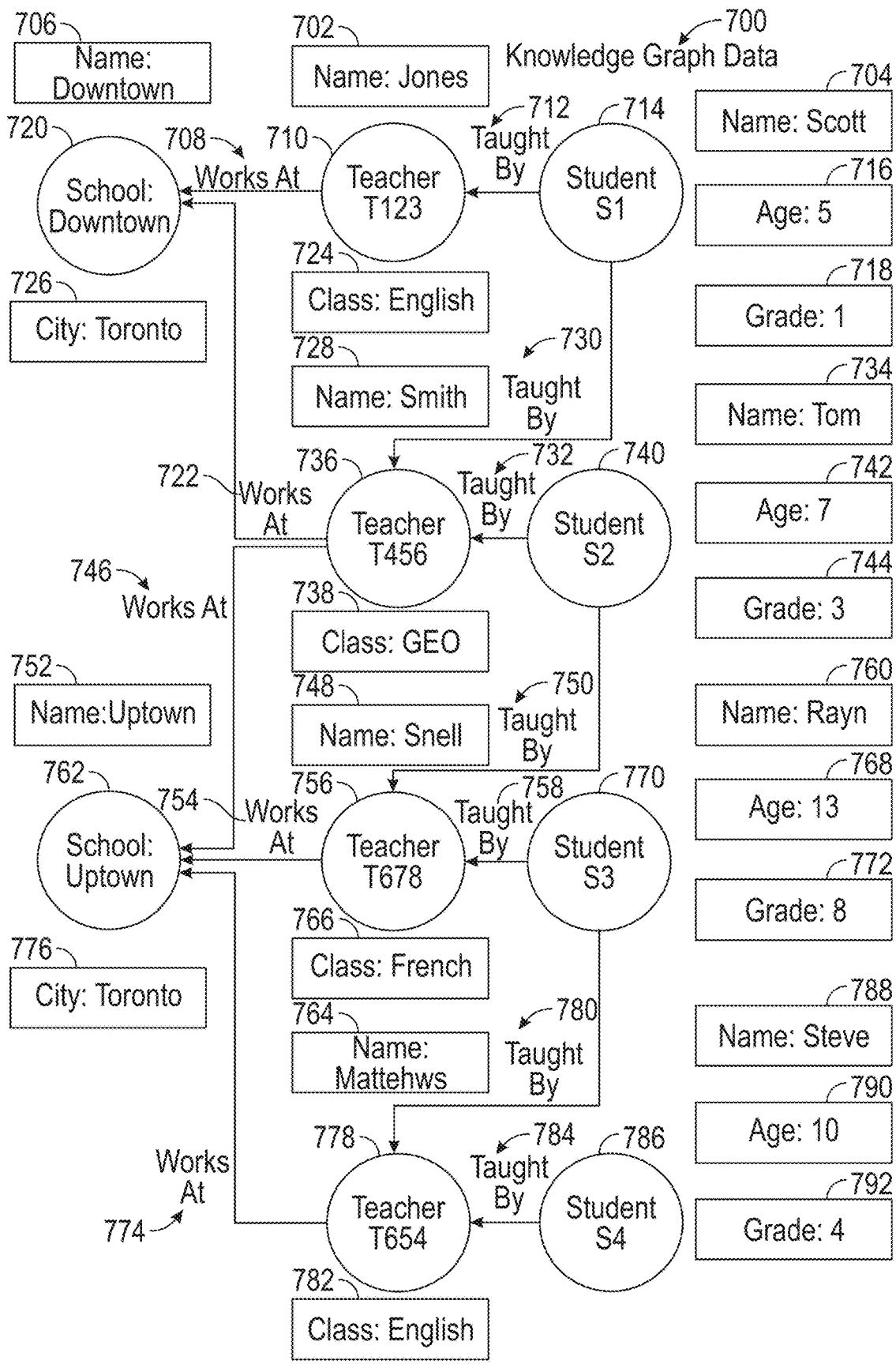
FIG. 7 shows another exemplary diagram of a knowledge graph, in accordance with some embodiments of the disclosure.

Interface services 310 are provided by the DPA. For example, SPARQL queries 302 may be received for execution 312 or for publication 314 (after translation to native CADS format by the DPA). The system may also receive a triples list 306 (e.g., in turtle format). Turtle format is described in "RDF 1.1 Turtle," W3C Recommendation 25 Feb. 2014 (which is herein incorporated by reference). The DPA may load 316 the triples list 306 for future translation. Other types of knowledge graphs 308 may also be received and processed 318. Exemplary knowledge graphs are shown in FIGS. 6 and 7 below.

Translation services 320 are also provided by the DPA. SPARQL may be converted by the DPA 322 to CADS native format (e.g., for execution) or to create a native object 324. The triplestore RDF list may also be converted 326 to native format by the translation services of the DPA. Additionally, sematic objects from knowledge graphs may be converted 328 by the DPA into schema Data Definition Language (DDL) that is understood by the CADS system.

CADS services 330 may also be provided by the DPA. In particular, the query 332 may be executed using CADS. Schema management 334 may be implemented by the DPA to manage the schema stored over CADS. Additionally, data may be loaded 336 into the CADS system by the DPA. The DPA may use CADS with compute 338 and storage 340 capabilities to store data in RDF storage schema 342 (described in more detail below) and to store published objects 334.

Figure 4:
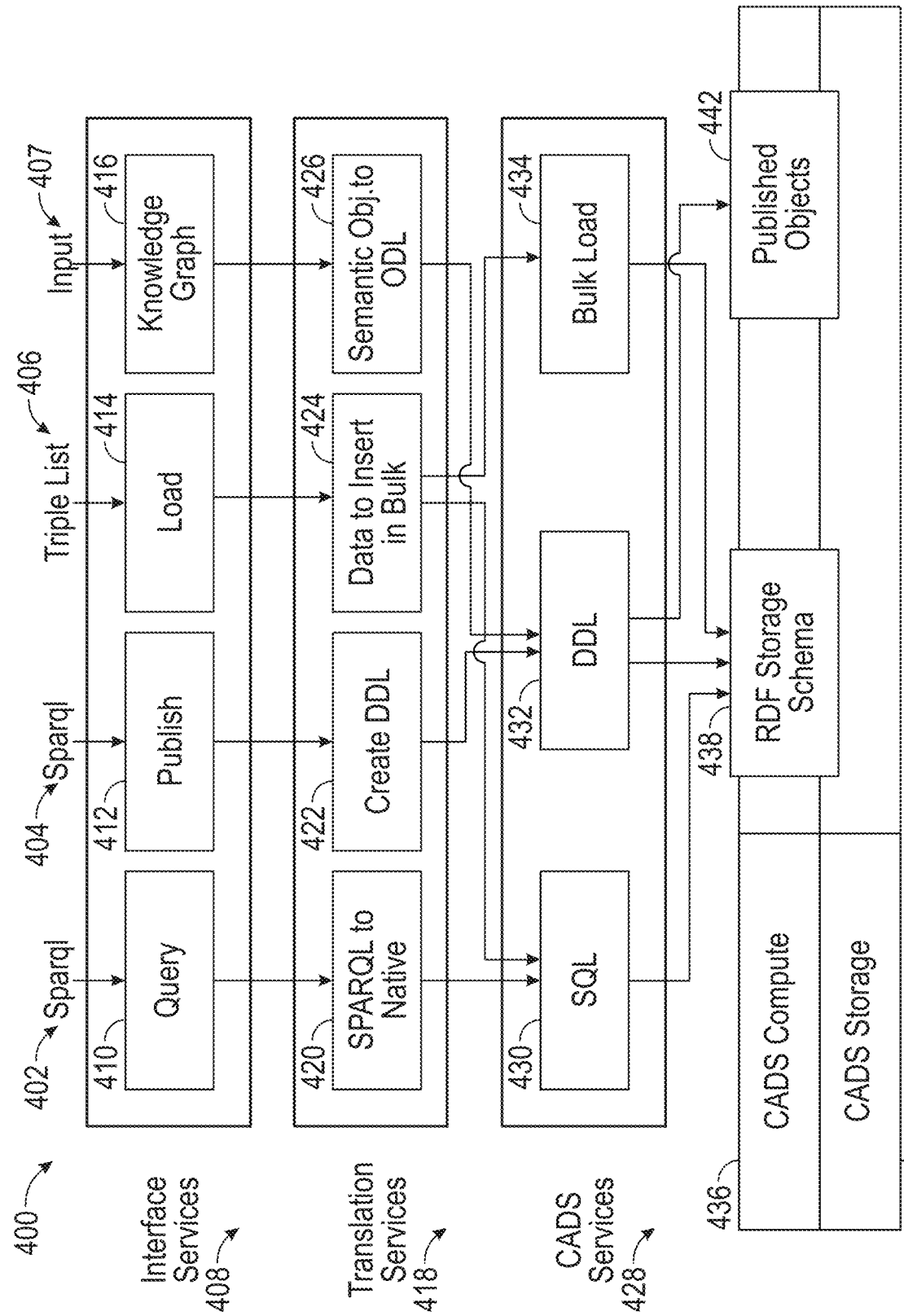
FIG. 4 shows yet another implementation of DPA, in accordance with some embodiments of the disclosure.

FIG. 4 Shows more another version of services described by FIG. 2.

Interface services 408 are provided by the DPA. For example, SPARQL queries 402 may be received for execution 410 or for publication 412 (after translation to native CADS format by the DPA). The system may also receive a triples list 406 (e.g., in turtle format. The DPA may load 414 the triples list 406 for future translation. Other types of knowledge graphs 407 may also be received and processed 416. Exemplary knowledge graphs are shown in FIGS. 6 and 7 below.

Translation services 418 are also provided by the DPA. SPARQL may be converted by the DPA 420 to CADS native format (e.g., for execution) or to create a native object Data Definition Language (DDL) object 422. Bulk data for insertion may be received 424 by the DPA. The DPA may also convert semantic objects to Operational Data Layer (ODL) 426.

CADS services 428 may also be provided by the DPA. In particular, the SQL query 430 may be executed using CADS. DDL management 432 may be implemented by the DPA to manage the schema stored over CADS. Additionally, data may be bulk loaded 434 into the CADS system by the DPA. The DPA may use CADS with compute 436 and storage 338 capabilities to store data in RDF storage schema 438 (described in more detail below) and to store published objects 440. The DPA may allow SQL queries 442 to directly interact with the stored objects 440.

Several techniques are provided below that enable functionality described by FIGS. 1-4.

Exemplary technique 1 for implementing an RDF Store over a Cloud Analytical Data Store (CADS) (e.g., as shown by FIGS. 2 and 3) is described herein.

The DPA may provide interface services based on open standards to allow integration with the RDF ecosystem. The DPA may provide interface service for querying that adheres to SPARQL or to any other suitable triple store query language. For example, the DPA ay providing interface service for loading data that accepts standard RDF data formats: N-Triples, N-Quads, RDF/XML, and Turtle.

The DPA may provide interface service for publishing queries to native objects (tables, views, data frames, etc.) in the underlying CADS. Optionally, the DPA provides interface service for specifying details of the Knowledge Model to facilitate management of the CADS schema required to support these methods. The DPA providing translation methods from received SPARQL query to native query language of the CADS (SQL, Scala, Java, Python, R, etc.). The DPA providing a method to define and/or manage the CADS schema required to support these methods, either automatically or driven by Knowledge Graph interface service. The DPA may also provide a translation method for converting received RDF data (Turtle, etc.) into data and metadata/instructions for loading into the CADS schema. The DPA also Provides a translation method from received SPARQL queries to persistent query-like objects (tables, views, dataframes, etc.) supported by the CADS.

These techniques enable a Standards-based interface allows integration into Knowledge Graph ecosystem and tool chain. The technique leverage CADS to provide data and compute at large scale. The techniques allow for publishing to native objects allows "native access" for performance and toolchain flexibility.

Exemplary technique 2 for implementing an RDF Store over a Cloud Data Warehouse (CDW), e.g., as shown by FIG. 4, is described herein.

The second technique describes a more specific exemplary technique for implementing steps of the first techniques on CDW. For example, the DPA may provide same interface services as the first technique. In addition, the DPA map provide translation method from SPARQL to SQL. The DPA may provide a translation method from Knowledge Graph changes into DDL. The DPA may provide a translation method from RDF Data (Turtle, etc.) into SQL Inserts and/or data warehouse-specific bulk load format.

The DPA may provide a method to create database views based on SPARQL queries translated to SQL and provide interface services based on open standards to allow integration with the RDF. These techniques enable business intelligence workloads to benefit from semantic organization of data via the Knowledge Graph due to SQL access to published views.

Exemplary technique 3 for implementing an RDF Store over a Cloud Data Lakehouse is described herein.

The third technique describes a more specific technique for implementing steps of the first techniques on Cloud Data Lakehouse. The DPA provides the same interface services as described above with relation to technique 1. In addition, the DPA provides translation method from SPARQL to DL-specific query language. (SQL, or Spark queries in Java, Scala, Python, R, etc.). The DPA provides translation method from Knowledge Graph changes into data Lakehouses (DLH)-specific schema. The DPA provides translation method from RDF Data into data and metadata/instructions for loading into the DLH schema. The DPA provides translation method from received SPARQL queries to persistent query-like objects (tables, views, dataframes, etc.) supported by the DLH.

These allows both business intelligence and Data Science workloads executed by the DPA to benefit from semantic organization of data via the Knowledge Graph due to SQL and Python/etc. access to native objects (dataframes, views, etc.).

Exemplary technique 4 for representing RDF data over a Cloud Analytical Data Store is described herein.

The fourth technique extends functionality of the first and second techniques. For example, the DPA providing methods that rely on tabular representation of data in CADS (e.g., as Shown by FIG. 5).

FIG. 5 shows exemplary tabular data representation of data (CADS scheme) 500. For example, each concept may have its own table 502-506. Each table may then include a row of instance IDs, and include an arbitrary number of other columns where each column lists properties for associated with each instance ID in column 1.

The DPA may also provide an unstructured representations on Lakehouses which may result in performance advantages unique to structured CADS representations like query planners driven by statistical metadata. The DPA provides methods over CADS that can adopt strategies rejected by implementations of RDF over relational database management systems (RDBMS) databases, as core CADS technology removes performance bottlenecks related to indexes common in RDBMS.

The DPA provides methods over CADS that can adopt strategies rejected by implementations of RDF over RDBMS databases, as core CADS technology makes frequent schema changes safer and faster. This refers specifically to CADS definitions of schema as metadata that is dynamically applied over storage schemes that may not directly match the schema model to facilitate distribution of the data over many nodes for both compute and storage.

The DPA provides triple store (e.g., RDF) representations (e.g., as shown in FIG. 5) that are tied to query strategies for processing semantic queries, and may be chosen to give optimum query performance on a specific CADS. The DPA provides for use of Knowledge Graphs represented by triples.

Exemplary technique 5 for representing RDF data over a Cloud Analytical Data Store—"Table By Concept with Columns By Properties" (e.g., as shown FIG. 5) is described herein. This technique is used, in some embodiments, to create the RDF Storage Schema of FIG. 2.

The 5th technique extends functionality of the fourth technique by creating CADS a scheme where the DPA uses tables separated by concept where columns to represent properties (e.g., as shown in FIG. 5). For example, the DPA provides, for each concept in the Knowledge Graph (e.g., graph 600 of FIG. 6 or graph 700 of FIG. 7), a unique table.

The DPA may store knowledge graph (e.g., triple store) data in Table Per Concept tables which may result in a plurality (e.g., thousands) of tables, which is uniquely enabled by the metadata-driven schema management of CADS whereas traditional Relational Database Management System (RDBMS) would be constrained by storage management overhead related to clustered indexes.

In some implementations, the DPA separates concept data by table which effectively allows "sharding" of data by a dimension (Concept ID, or set of concept ID's) which may always present in a semantic query. In an alternative approach, the DPA stores all concept data in a single table and adds concept ID as a dimension which must be managed efficiently by optimization schemes at the table level, which vary by CADS and may be limited. For example, in some implementation micro partitions are limited to the most significant (left) 20 characters in an implicit or explicitly defined cluster key.

In some implementations, the DPA represents each property for a given concept by a unique column in the concept table (e.g., in tables 502-506 of FIG. 5). This approach may be referred to as "wide" approach. The approach provides a benefit of requiring fewer table joins to execute a given query, since all properties required from a single instance of a concept can be obtained from a single instance of the table.

If this approach was implements on RDBMS instead of CADS, several disadvantages would be encountered. For example, computationally expensive schema management (adding and deleting columns when properties are added to the concept) is alleviated by the metadata schema approach common to CADS.

In some embodiments, if properties have multiple values for a given concept instance, they must be stored in a list (or similar) in a single row, requiring extra support at query time. In some approaches, tables cluster or partitioning schema may be set to the concept instance identifier The 5th technique may be enabled by the following pseudocode:

```
For Each Concept in Knowledge Model:
    Create Concept Table with Columns (ID)
    For Each Property in Concept:
        Create Property Column in Concept Table
```

The 5th technique may be enabled by the following SQL code:

```
'CREATE OR REPLACE TABLE "' + conceptName + '-wide" (id string, ' +
','.join(properties) + ') CLUSTER BY (id);'
```

FIGS. 6-9 provide an exemplary implementation of technique 5.

FIG. 6 Shows an exemplary knowledge graph structure 600 (e.g., for school district data.) Exemplary knowledge graph structure 600 defines concepts "Student" 608, "teacher" 612, and "School" 618. Each concept may have properties defined for that concept. For example, student concept 608 may have properties: grade 606, name 602, age 604, and may be linked by a relational property "taught by" 608 to concept 612. Concept teacher 612, may have properties name 610 and class 613, and may be linked by a relational property "works at" 620 to concept 618. Concept teacher 618, may have properties name 618 and city 622.

FIG. 7 shows an exemplary knowledge graph 700 based on the structure of FIG. 6, with several instances for each concept "Student," "teacher," and "School." Each concept instance has properties and links to particular other instances.

In particular, there may be two concept instances of "school" concept 720, and 762. These may have unitary properties 706, 726, 752, and 776.

There may be four concept instances of "teacher" concept 710, 736, 756, and 778. These may have unitary properties 702, 724, 728, 738, 748, 766, 764, and 782. They may also have relational properties 708, 722, 746, 754, and 774.

There may also be four concept instances of "student" concept 714, 740, 770, and 786. These may have unitary properties 704, 716, 718, 734, 752, 744, 760, 768, 772, 788, 790, and 792. They may also have relational properties 712, 730, 732, 750, 758, 780, and 784.

In some embodiments, prior to convention to CADS, these may be stored as triple store data (e.g., RDS). However, such storage would not allow for leveraging of CADS functionalities and compute.

FIG. 8 shows an exemplary triple store data 800 for the exemplary knowledge graph shown in FIG. 7. For example, the data may be stored triples in rows of a single table 808. Each row 802-806 may define Subject-predicate-object for each concept instances. Predicate "A" may indicate that object is a unitary property of the subject. Such tables are unwieldy to store in tabular form and present storage and computational challenged for handing queries.

FIG. 9 shows an exemplary result of the DPA applying the 5th technique (for representing triple store data over a Cloud Analytical Data Store using a "wide" approach). As can be seen. each concept has its own table defining all properties for each instances in a separate column.

For example, table 902 (Student) stores data for each concept instance of "Student" in knowledge graph of FIG. 7. As shown, column 904 stores a unique concept instance ID. While columns 906-912 store data for each unitary and relational property of the relevant concept instance. For example, columns 906-910 simply store values of the properties, while column 912 store IDs of other concept instances linked by a relationship property. For example, student "Ryan" is linked by "taught by" property to concept instances T678 and T654 identified by column 912. Concept instances T678 and T654, may in turn be stored in column 916 of "Teacher" table 914 and may uniquely identify concept instances of the "teacher" concept.

For example, column 916 of "Teacher" table 914 stores a unique concept instance ID. Columns 918-922 store unitary and relational properties of "teacher" concept instances.

In the shown example, column 926 of "School" table 924 stores a unique concept instance ID. Columns 928-990 may store unitary and relational properties of "school" concept instances.

Exemplary technique 6 for representing RDF data over a Cloud Analytical Data Store—"Table by Concept with Property Key and Value Columns" is described herein. This technique may be used to create an alternative RDF Storage Schema of FIG. 2.

Exemplary technique 6 extends functionality of the fourth technique by creating CADS a scheme where Each Concept in the Knowledge Graph (e.g., Web Ontology Language (OWL) concept) is represented by a unique table.

FIG. 10 provides exemplary data structure 1000 for this techniques. As shown each concept 1-N may have its own table 1002-1010. All property data is stored in two columns (e.g., 1006-1008 or 1014-1016) representing a key (Property Name or property ID) and value (Property Value) for each value of the Concept identifier (stored in a third column e.g., 1004 or 1012)

The DPA may execute technique as described herein. For example, the DPA represents each concept in the Knowledge Graph (e.g., OWL concept) by a unique table.

Generation of Table Per Concept data (e.g., data shown in FIG. 10) results in generation of multiple (e.g., thousands) tables, which is uniquely enabled by the metadata-driven schema management of CADS whereas traditional RDBMS would be constrained by storage management overhead related to clustered indexes.

The DPA separating concept data by table (e.g., tables 1002, 1010) effectively allows "sharding" of data by a dimension (concept ID, or set of concept id's) which may always present in a semantic query. In another approach storing all Concept' data in a single table adds concept id as a dimension which may be managed efficiently by optimization schemes at the table level, which vary by CADS. For example, micro partitions are limited to the most significant (left) 20 characters in an implicit or explicitly defined cluster key.

In some embodiments, all property data is stored by the DPA in two columns representing a key (Property Name) and value (Property Value) for each value of the Concept identifier (stored in a third column). This approach, may be called "narrow" approach, allows for simplified schema management, and allows for storing multiple property values for the same concept identifier across multiple rows, eliminating the need to unpack lists at query time.

This approach may require additional table joins at query time as each property required for a given concept may require an additional instance of the concept table.

In one approach, tables cluster or partitioning schema are set by the DPA to the concept instance identifier. In another approach, tables cluster or partitioning schema are set by the DPA to the predicate (e.g., Property or Relationship name).

The 6th technique may be enabled by the following pseudocode:

```
For Each Concept in Knowledge Model:
    Create Concept Table with Columns (ID, Property ID, Property-
    Value)
```

The 6th technique may be enabled by the following SQL code:

```
'CREATE OR REPLACE TABLE "' + conceptName + '-narrow" (id string, propid
string, value string) CLUSTER BY (id);'
```

The system (when executing the DPA) may arbitrate between 5th technique (broad) or 6th technique (narrow) using several approaches (e.g., at the time of conversion of triple store to CADS data scheme). For example, the technique may be selected by a user interface generated by the DPA. In another approach the input knowledge graph (e.g., graph 700 of FIG. 7) may be analyzed (e.g., with a trained AI) to decide which approach is to be used. For example, the AI may be trained using a database of triple store data systems that resulted in a narrow scheme performing better and/or a database of triple store data systems that resulted in a wide scheme performing better. A classifier neural net is then trained to return likelihood of narrow or wide scheme working better based on coefficients trained using known inputs described above. At the time of ingestions, the DPA inputs all or some of the triple store data into the classifier neural net and decides whether to use a narrow or wide scheme. In another approach an empirical testing may be used by the DPA. For example, the DPA may create both CADS schemas for each of the approaches and evaluate performance. In one embodiment, SPARQL queries may be translated into intermediate form (e.g., as shown below) such that the intermediate form may be easily translated into forms needed to search CADS schemas created by either 5th technique (broad) or 6th technique (narrow).

FIG. 11 shows exemplary resulting data 1100 by the DPA of the 6th technique to knowledge graph of FIGS. 6 and 7. As shown, table 1102 is created which stores all properties for each student in columns 1106 and 1108 with column 1102 used to store unique concept IDs. As shown, table 1110 is created which stores all properties for each teacher in columns 1114 and 1116 with column 1112 used to store unique concept IDs. One skilled in the art would recognize that any other knowledge graphs may be converted by the DPA into suitable broad and/or narrow tabular representation in a similar fashion as shown in FIGS. 9-11.

In some embodiments each of the tables 1102, 1110 may comprise another column that identifies whether the property is unitary or relational. For example, marker "un" can indicate unitary property, and marker "rel" can indicate a relational property. In some embodiments, the additional fourth column in table 1102 may indicate "un" for properties "age," and "name" since these have unitary values "10" and "Steve," and may indicate "rel" for properties "grader" and "taught by," since those point to other concept instances (T678 and T654). This additional column may be used by the DPA to improve query handling as described below.

Exemplary technique 7 for representing RDF data over a Cloud Analytical Data Store—"Table by Concept and Property Type with Property Key and Value Columns" is described herein (e.g., for generation of data as shown FIG. 12).

The 7th technique extends functionality of the 6th technique in that the DPA generates two tables which are created by concept, one for literal/unitary properties (for example, strings, numbers, dates) and one for relational properties (for example, properties whose type is another concept, for example "taught_by" property 608 of FIG. 6). This techniques may be performed by DPA as a part of several query building strategies.

The 7th technique may be enabled by the following pseudocode:

```
For Each Concept in Knowledge Model:
    Create Concept Relations Table with Columns (ID, RelationID,
Relation Value)
    Create Concept Literals Table with Columns (ID, Property ID,PropertyValue)
```

The 7th technique may be enabled by the following SQL code:

```
'CREATE OR REPLACE TABLE "' + conceptName + '-narrowRel" (idstring, relid
string, value string) CLUSTER BY (id);'
'CREATE OR REPLACE TABLE "' + conceptName + '-narrowProp" (idstring,
propid string, value string) CLUSTER BY (id);
```

FIG. 12 shows such tables 120 created by the DPA based, for example, on Knowledge Graph of FIGS. 6 and 7. As shown, table 1202 and 1210 are created separately. Table 1202 includes row 1204 for unique concept instance ID, with column 1206 containing the name of the unitary property, and column 1208 corresponding value. Table 1210 includes row 1210 for unique concept instance ID, with column 1214 containing the name of the relational property, and column 1216 corresponding value (e.g., concept instance ID of a concept instance related by the relational property).

Exemplary technique 8 for representing RDF data over a Cloud Analytical Data Store—"Multiple Tables by Concept with Property Key and Value Columns with Variable Clustering" is described herein.

The 8th technique extends $6^{th}$ technique by allowing the DPA to maintaining all elements of technique 6, but adding a duplicate table per concept that is organized (e.g., clustered) by predicate (e.g., Property or Relation Name). This strategy is valuable to several query building strategies, at the cost of duplicating data.

The 8th technique may be enabled by the following pseudocode:

```
For Each Concept in Knowledge Model:
    Create Concept Table with Columns (ID, PropertyID, PropertyValue)
    Create Concept Table with Columns (ID, PropertyID,PropertyValue) Clustered by
    Property ID
```

The 8th technique may be enabled by the following SQL code:

```
'CREATE OR REPLACE TABLE "' + conceptName + '-narrowSubject" (id string, propid
string, value string) CLUSTER BY (id);'
'CREATE OR REPLACE TABLE "' + conceptName + '-narrowPredicate" (id string,
propid
string, value string) CLUSTER BY (propid);'
```

Exemplary technique 23 for representing RDF data over a Cloud Analytical Data Store—"Table by Concept with Property Key, Property Type, and Value Columns" is described herein.

The $23^{rd}$ technique modifies the $6^{th}$ technique by addition of an additional property to each concept table to distinguish literal properties (for example: strings, numbers, dates, etc.) from relational properties (for example, properties whose type is another concept, e.g., "taught_by." etc.).

For example, the DPA may separate property data by type to allow for partitioning/clustering by a dimension that is used differently in different parts of a semantic query, improving query performance. In some embodiments, this approach requires the corresponding query building strategy used by the DPA to include the type column as it builds different parts of the user query representing relationship/edge traversal versus retrieving literal values. In some embodiments, tables cluster or partitioning schema is set by the DPA to the type column.

The 23 rd technique may be enabled by the following pseudocode performed by the DPA:

```
For Each Concept in Knowledge Model:
    Create Concept Table with Columns (ID, Property ID, PropertyType,
PropertyValue
```

The 23 rd technique may be enabled by the following SQL code:

```
'CREATE OR REPLACE TABLE'"+ conceptName +
'-narrow"(id string, relid string, type string, value string)
CLUSTER BY (type);
```

Exemplary technique 9 for answering SPARQL queries over a Cloud Analytical Data Store is described herein. This technique enables the DPA to answer SPARQL query as shown in FIG. 3.

The 9th technique may be implemented as follows. The DPA may provide for execution (e.g., via an interface or remote call) a function that takes as input the text of a query in the SPARQL query language. The DPA then generates as output a corresponding query written in a query language appropriate to the underlying CADS, such as SQL, Python, or any other suitable language. Optionally, the DPA may create an intermediate representation of the semantic query wherein a SPARQL query is broken down into the same intermediate representation, such as JSON or other notation, independent of the final query generated to suit the CADS.

Figure 13:
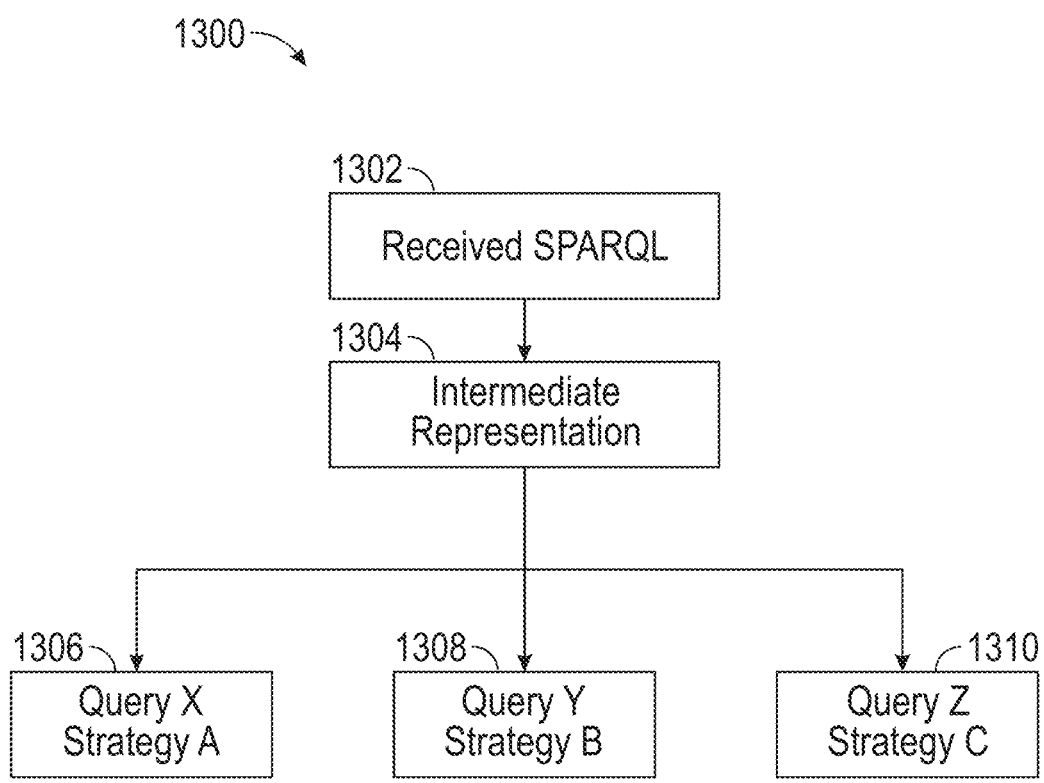
FIG. 13 shows an exemplary flowchart handling triple store queries, in accordance with some embodiments of the disclosure.

FIG. 13 shows an example of data processing 1300 performed by the DPA to execute the 9th technique. For example, the DPA may receive a SPARQL query 1302 and change it into an intermediate representation 1304. The intermediate representation is changed into one or more queries (e.g., SQL queries) for running native CADS queries over tables created using one or more approaches above. For example, the intermediate representation may be converted to query X for strategy A 1306, to query Y for strategy A 1308, and/or to query Z for strategy C 1310.

The 9th technique may be illustrated by the following example SPARQL query for retrieving all combinations of Students and Teachers names (e.g., from Knowledge Graph in FIGS. 6 and 7).

```
prefix ExampleQuery:<http://example/Example/>
SELECT ?S_Name, ?T_Name
WHERE
{
?S a ExampleQuery:Student.
?S ExampleQuery:name ?S_N.
?S ExampleQuery:taught_by ?T.
?T a ExampleQuery:Teacher.
?T ExampleQuery:name ?T_N.
}
```

This query may be translated by the DPA into JSON-like encoding as follows. (A person skilled in the art would understand that techniques this can be extended to include all aspects of SPARQL code, including aggregates, grouping, filters, etc.):

```
{"conceptInstances": {
"Student1": {"type":"http://example /Example/Student",
"typeLabel":"Student",
"literals":[
{"url":"http://example /Example/Student#name",
"label":"name"}
],
"relations":[
{"url":"http://example /Example/Student#taught_by",
"label":"taught_by",
"type":"http://example /Example/Teacher",
"target":"Teacher1"}
]},
```

```
"Teacher1": {"type":"http://example /Example/Teacher".
"typeLabel":"Teacher",
"literals":[
{"url":"http://example /Example/Teacher#name",
"label":"name"}
],
"relations":[ ]}}
```

Exemplary technique 10 for answering SPARQL queries over a Cloud Analytical Data Store is described herein.

The 10th technique is implemented by the DPA by extending the 9th technique. For Example, the DPA may perform a method (and subsequent child methods extending specific strategies) to generates an output query in a SQL (or SQL-like) query language. For example, the DPA may use several subsequent methods described below that implement specific strategies for query generation (with examples given against the notional intermediate query representation from technique 9) with each strategy tied to one potential triple store (e.g., RDF) representation schema from techniques described above.

In one approach, the DPA uses query constructs like GROUP BY and SELECT clause aggregates that are common to all SQL strategies described below.

Exemplary technique 11 for answering SPARQL queries over a Cloud Data Lakehouse—"General Purpose Query Language with Appropriate Libraries" is described herein.

The 11th technique may be implemented by the DPA by extending the 9th technique (as an alternative to technique 10). For example, the DPA may generates an output query in a general-purpose programming language (e.g., Python, Scala) referencing libraries allowing interface with a Cloud Data Lakehouse (e.g., PySpark). A person skilled in the art would appreciate that general process flow outlined in technique 10 can be adapted to generate other suitable non-SQL query code.

Exemplary technique 12 for answering SPARQL queries over a Cloud Analytical Data Store—"Wide" is described herein.

The 12th technique may be implemented by the DPA by extending the 10th technique as follows. In some embodiments, due to data processing performed by the DPA ach concept instance in the semantic query results in a single table instance joined in the FROM clause of the resultant SQL query. In one approach, where more than one instance of a concept is included in a query, the same number of instances of their corresponding table will appear in the SQL with different aliases. Performance impact of querying wide tables may be alleviated by the DPA using CADS with columnar schema representations. In some embodiments, clustering on concept instance ID columns is supportive of performance on filtered queries where a CADS query planner can rapidly narrow down the set of concept instances for the query, allowing query pruning. In some embodiments, query pruning by the subset of properties required by the semantic query is not available, requiring full scanning within the subset of pruned concept instance identifiers. In some implementations, Multi-valued properties (including relations) may require separate handling in query building.

The 12th technique may be implemented by following steps performed by the DPA (e.g., to process a query for data stored in CADS as shown in FIG. 9).

1. The DPA builds a list "queryRelations" of all relations in query, with the name of the relation property and the identifiers for the subject and object concept instances.

2. The DPA, for each concept instance in the query, adds a table to the FROM clause referenced by the concept type label (e.g., Student) and aliased by the concept instance identifier (e.g., Student1)
3. The DPA appends an INNER JOIN clause if that instance is not the first instance added to the FROM clause.
4. The DPA construct a filter condition for the INNER JOIN clause from a list of all previously added concept instances (and thus table aliases), combining with AND as appropriate.
5. The DPA examines the queryRelations list to determine the directionality of the relation between the two concept instances to determine the exact filter conditions for the INNER JOIN.
6. The DPA adds the concept instance to a list of previously visited concept instances.
7. The DPA, for all literal properties of the concept instance, adds them to the SELECT clause, aliased with the concept instance and property label.
8. The DPA, for all literal properties of the concept instance, for any filters on each property, adds them to the WHERE clause.
9. The DPA combines SELECT, FROM and WHERE clauses into a complete SQL query.

The 12th technique may result in the following SQL code:

```
SELECT Student1.name Student1_name, Teacher1.name Teacher1_name
FROM Student-wide AS Student1
    INNER JOIN Teacher-wide AS Teacher1
    ON Student1.taught_by = Teacher1.id
```

The 12th technique may result in a fewer JOIN statements, a computationally intensive operation, potentially using table scanning and additional schema management requirements.

Exemplary technique 13 for answering SPARQL queries over a Cloud Analytical Data Store—"Narrow with Pre-Aggregated Relations" is described herein.

The 13th technique is implemented by the DPA by extending the 10th technique as follows (reliant on representational schema of technique 6, e.g., to process a query for data stored in CADS as shown in FIG. 12).

The DPA adds a table instance to the FROM clause for every relationship and literal property in the semantic query (a much higher number than in a "wide strategy.") The DPA constructs a subquery to represent relation properties connecting all required concept instances, and minimized with distinct keyword prior to adding literal properties. The DPA minimizes schema management for all narrow strategies as additional properties do not require table modification. The DPA performs clustering on concept instance id columns which is supportive of performance on filtered queries where a CADS query planner can rapidly narrow down the set of concept instances for the query, allowing query pruning. The DPA may perform full scanning within the subset of pruned concept instance identifiers.

The 13th technique may be implemented by following steps performed by the DPA.

1. The DPA builds a list of "queryRelations" of all relations in query, with the name of the relation property and the identifiers for the subject and object concept instances.
2. The DPA, for each concept instance in the query, adds a table to the FROM clause of a "relations" subquery referenced by the concept type label (e.g., Student) and aliased by the concept instance identifier (e.g., Student1).
3. If that instance is not the first instance added to the subquery FROM clause, the DPA appends an INNER JOIN clause.
4. The DPA forms a list of all previously added concept instances (and thus table aliases) to construct a filter condition for the INNER JOIN clause, combining with AND as appropriate.
5. To determine the exact filter conditions for the INNER JOIN, the DPA examines the queryRelations list to determine the directionality of the relation between the two concept instances.
6. The DPA adds the concept instance to a list of previously visited concept instances.
7. The DPA uses this subquery as the first element in the query FROM clause.
8. The DPA, for each concept instance in the query, adds a table to the FROM clause for every literal property in the semantic query, aliasing each with the concept instance identifier plus the property identifier.
9. The DPA append an INNER JOIN clause with filter conditions connecting the property table alias to the corresponding concept instance relation alias in the "relations" subquery, by concept instance id.
10. The DPA further adds a filter condition to the INNER JOIN limiting the property table alias to rows where the property identifier matches the required literal property from the semantic query.
11. The DPA, for all literal properties of the concept instance, adds them to the SELECT clause, aliased with the concept instance and property label.
12. The DPA, for any filters on each property, adds them to the WHERE clause.
13. The DPA combines SELECT, FROM and WHERE clauses into a complete SQL query.

The 13th technique may result in the following SQL code:

```
SELECT Student1_name.value AS Student1_name,
Teacher1_name.value AS
Teacher1_name
FROM (SELECT DISTINCT Student1.id AS Student1_id,
Teacher1.id AS Teacher1_id
FROM Student-narrow AS Student1
INNER JOIN Teacher-narrow AS Teacher1
ON Student1.value = Teacher1.id
AND Student1.prop = 'taught_by'
) AS rels
INNER JOIN Student-narrow AS Student1_name
ON rels. Student1_id = Student1_name.id
INNER JOIN Teacher-narrow AS Teacher1_name
ON rels. Teacher1_id = Teacher1_name.id
```

The 13th technique may result in the schema management (as additional literal and relation properties are added to the knowledge graph) being reduced. Number of joins may be increased, but in many implementations the amount of data fed to each join will be reduced, enhancing performance of the DPA.

Exemplary technique 14 for answering SPARQL queries over a Cloud Analytical Data Store—"Narrow with Opportunistic Relation Compression" is described herein.

The 14th technique may be implemented by the DPA by extending technique 10 by generating a SQL query reliant on the RDF representational schema described in technique 6. The method extends technique 13 with some modifications. For example, the DPA may perform 14th technique by performing the 13th technique with the following modifications. In some embodiments, instead of a "relations" subquery to integrate all relations between concept instances, the DPA instead simply joins a table instance for every concept id to the main SQL FROM clause to be used to implement the relations. For example, each concept instance may be tested by the DPA for the presence of relation properties, and in the case where none exist, the table is enclosed by the DPA in a subquery minimizing it to a list of unique concept instance identifiers. This approach provides maximum opportunity to the CADS query planner/optimizer by not pre-supposing optimizations as in 13th technique's reduction of relation properties prior to joining tables for literal properties.

The 14th technique may be implemented by following steps performed by the DPA.

1. The DPA build a list "queryRelations" of all relations in query, with the name of the relation property and the identifiers for the subject and object concept instances.
2. The DPA, for each concept instance in the query, adds a table to the FROM clause referenced by the concept type label (e.g., Student) and aliased by the concept instance identifier (e.g., Student1).
3. If that concept instance contains no relation properties, The DPA encloses it in a subquery returning only unique values of the concept instance id column.
4. If that instance is not the first instance added to the subquery FROM clause, The DPA appends an INNER JOIN clause.
5. The DPA, from a list of all previously added concept instances (and thus table aliases), construct a filter condition for the INNER JOIN clause, combining with AND as appropriate.
6. To determine the exact filter conditions for the INNER JOIN, The DPA examines the queryRelations list to determine the directionality of the relation between the two concept instances.
7. The DPA adds the concept instance to a list of previously visited concept instances.
8. For each literal property for this concept instance in the semantic query, The DPA adds a table instance to the FROM clause, aliasing each with the concept instance identifier plus the property identifier.
9. The DPA append an INNER JOIN clause with filter conditions connecting the property table alias to the corresponding concept instance relation alias, by concept instance id.
10. Further, the DPA add a filter condition to the INNER JOIN limiting the property table alias to rows where the property identifier matches the required literal property from the semantic query.
11. The DPA, for all literal properties of the concept instance, adds them to the SELECT clause, aliased with the concept instance and property label.
12. The DPA, for any filters on each property, adds them to the WHERE clause.
13. The DPA combines SELECT, FROM and WHERE clauses into a complete SQL query.

The 14th technique may result in the following SQL code:

```
SELECT Student1_name.value AS Student1_name,
Teacher1_name.value AS
Teacher1_name FROM Student-narrow AS Student1
INNER JOIN (SELECT DISTINCT id FROM Teacher-narrow)
AS Teacher1 ON
  Student1.value = Teacher1.id AND Student1.prop = 'taught_by'
INNER JOIN Student-narrow AS Student1_name ON Student1.id =
  Student1_name.id
INNER JOIN Teacher-narrow AS Teacher1_name ON Teacher1.id =
  Teacher1_name.id
```

Exemplary technique 15 for answering SPARQL queries over a Cloud Analytical Data Store—"Narrow with Schema by Property Type" is described herein.

The 14th technique is implemented by the DPA by extending technique 10 by generating a SQL query reliant on the RDF representational schema described in technique 7. This method builds on technique 14, modifying as follows. Instead of a using the 'narrow' schema strategy from technique 6, the DPA leverages the separation of literal and relation properties in separate tables as per technique 7.

The 15th technique may be implemented by following steps performed by the DPA.

1. The DPA builds a list "queryRelations" of all relations in query, with the name of the relation property and the identifiers for the subject and object concept instances.
2. The DPA, for each concept instance in the query, adds a table to the FROM clause referenced by the concept type label (e.g., Student) and aliased by the concept instance identifier (e.g., Student1). The DPA map use concept tables with containing relation property data.
3. If that concept instance contains no relation properties, the DPA encloses it in a subquery returning only unique values of the concept instance id column.
4. If that instance is not the first instance added to the subquery FROM clause, the DPA appends an INNER JOIN clause.
5. The DPA, from a list of all previously added concept instances (and thus table aliases) construct a filter condition for the INNER JOIN clause, combining with AND as appropriate.
6. To determine the exact filter conditions for the INNER JOIN, the DPA examine the queryRelations list to determine the directionality of the relation between the two concept instances.
7. The DPA add the concept instance to a list of previously visited concept instances.
8. The DPA, for each literal property for this concept instance in the semantic query add a table instance to the FROM clause, aliasing each with the concept instance identifier plus the property identifier. The DPA uses concept tables with containing literal property data.
9. The DPA appends an INNER JOIN clause with filter conditions connecting the property table alias to the corresponding concept instance relation alias, by concept instance id.
10. Further, the DPA adds a filter condition to the INNER JOIN limiting the property table alias to rows where the property identifier matches the required literal property from the semantic query.
11. For all literal properties of the concept instance, the DPA adds them to the SELECT clause, aliased with the concept instance and property label.
12. For any filters on each property, the DPA adds them to the WHERE clause.
13. The DPA combines SELECT, FROM and WHERE clauses into a complete SQL query.

The 15th technique may result in the following SQL code:

```
SELECT Student1_name.value AS Student1_name,
Teacher1_name.value AS
Teacher1_name
FROM Student-narrowRel AS Student1
INNER JOIN (SELECT DISTINCT id FROM Teacher-narrowRel)
AS Teacher1
ON Student1.value = Teacher1.id AND Student1.prop = 'taught_by'
INNER JOIN Student-narrowLit AS Student1_name
ON Student1.id = Student1_name.id
INNER JOIN Teacher-narrowLit AS Teacher1_name
ON Teacher1.id = Teacher1_name.id
```

Exemplary technique 16 for answering SPARQL queries over a Cloud Analytical Data Store—"Narrow with Predicate Organized Schema" is described herein.

The 16th technique is implemented by extending technique 10 by generating a SQL query reliant on the RDF representational schema described in technique 8. This method builds on technique 14, modifying as follows. Instead of a using the 'narrow' schema strategy from technique 6, the DPA leverages the separation of concept instance organized and property organized data in separate tables as per technique 8. Table organization (e.g., clustering) by property (predicate) allows the DPA to partition or micro-partition the table by property. This allows the DPA to perform aggressive query pruning to eliminate data for properties (both literal and relations) that are unused in the semantic query.

The 16th technique may be implemented by following steps performed by the DPA:
1. The DPA builds list "queryRelations" of all relations in query, with the name of the relation property and the identifiers for the subject and object concept instances.
2. The DPA, for each concept instance in the query, adds a table to the FROM clause referenced by the concept type label (e.g., Student) and aliased by the concept instance identifier (e.g., Student1). The DPA uses concept tables organized by property.
3. If that concept instance contains no relation properties, the DPA enclose it in a subquery returning only unique values of the concept instance id column.
4. If that instance is not the first instance added to the subquery FROM clause, the DPA appends an INNER JOIN clause.
5. The DPA, from a list of all previously added concept instances (and thus table aliases) constructs a filter condition for the INNER JOIN clause, combining with AND as appropriate.
6. To determine the exact filter conditions for the INNER JOIN, the DPA examines the queryRelations list to determine the directionality of the relation between the two concept instances.
7. The DPA adds the concept instance to a list of previously visited concept instances.
8. For each literal property for this concept instance in the semantic query the DPA adds a table instance to the FROM clause, aliasing each with the concept instance identifier plus the property identifier. The DPA uses concept tables organized by property.
9. The DPA appends an INNER JOIN clause with filter conditions connecting the property table alias to the corresponding concept instance relation alias, by concept instance id.
10. Further, the DPA add a filter condition to the INNER JOIN limiting the property table alias to rows where the property identifier matches the required literal property from the semantic query.
11. For all literal properties of the concept instance, the DPA adds them to the SELECT clause, aliased with the concept instance and property label.
12. For any filters on each property, the DPA adds them to the WHERE clause.
13. The DPA combine SELECT, FROM and WHERE clauses into a complete SQL query.

The 16th technique may result in the following SQL code:

```
SELECT Student1_name.value AS Student1_name,
Teacher1_name.value AS
Teacher1_name
FROM Student-narrowPred AS Student1
INNER JOIN (SELECT DISTINCT id FROM Teacher-narrowPred)
AS Teacher1
ON Student1.value = Teacher1.id AND Student1.prop = 'taught_by'
INNER JOIN Student-narrowPred AS Student1_name
ON Student1.id = Student1_name.id
INNER JOIN Teacher-narrowPred AS Teacher1_name
ON Teacher1.id = Teacher1_name.id
```

This approach yields performance benefits from query pruning for common use cases where a small subset of the total properties in the knowledge graph are used by the DPA in the query. This advantage still exists where a small subset of concept instances is identified early in the query plan.

Example technique 24 for answering SPARQL queries over a Cloud Analytical Data Store—"Narrow with Type column and Predicate Organized Schema" is described herein.

Technique 24 further extends technique 10 by allowing the DPA to generate a SQL query reliant on the RDF representational schema described in techniques 23. Technique 24 is similar to technique 14, with the following changes. Instead of a using the 'narrow' schema strategy, the DPA leverages the separation of relationship properties from literal properties via the type column as described in technique 23.

The 24th technique may be implemented by following steps performed by the DPA.
1. The DPA builds list "queryRelations" of all relations in query, with the name of the relation property and the identifiers for the subject and object concept instances.
2. For each concept instance in the query, the DPA add a table to the FROM clause referenced by the concept type label (e.g., Student) and aliased by the concept instance identifier (e.g., Student1).
3. If that concept instance contains no relation properties, the DPA encloses it in a subquery returning only unique values of the concept instance id column.
4. If that instance is not the first instance added to the subquery FROM clause, the DPA appends an INNER JOIN clause.
5. The DPA, from a list of all previously added concept instances (and thus table aliases), constructs a filter condition for the INNER JOIN clause, combining with AND as appropriate.
6a. To determine the exact filter conditions for the INNER JOIN, the DPA examines the queryRelations list to determine the directionality of the relation between the two concept instances.
6b. When specifying the relation property in these join conditions, the DPA also specify the "type" column that has the value indicating a relation property (e.g., type="r" in some implementations)
7. the DPA adds the concept instance to a list of previously visited concept.

8. For each literal property for this concept instance in the semantic query, the DPA adds a table instance to the FROM clause, aliasing each with the concept instance identifier plus the property identifier.
9. The DPA appends an INNER JOIN clause with filter conditions connecting the property table alias to the corresponding concept instance relation alias, by concept instance id.
10. Further, the DPA adds a filter condition to the INNER JOIN limiting the property table alias to rows where the property identifier matches the required literal property from the semantic query. When specifying the literal property in these join conditions, the DPA also specifies the "type" column has the value indicating a relation property (e.g., type="r" in some implementations).
11. For all literal properties of the concept instance, the DPA adds them to the SELECT clause, aliased with the concept instance and property label.
12. For any filters on each property, the DPA adds them to the WHERE clause.
13. The DPA combine SELECT, FROM and WHERE clauses into a complete SQL query.

This approach yields performance benefits from query pruning for common use cases where a small subset of the total properties in the knowledge graph are used in the query.

The 24th technique may result in the following SQL code:

```
SELECT Student1_name.value AS Student1_name,
Teacher1_name.value AS
Teacher1_name
FROM Student-narrow AS Student1
  INNER JOIN (SELECT DISTINCT id FROM Teacher-narrow)
  AS Teacher1
    ON Student1.value = Teacher1.id
    AND Student1.type = 'rel'AND Student1.prop = 'taught_by'
  INNER JOIN Student-narrowPred AS Student1_name
    ON Student1.id = Student1_name.id AND
    Student1_name.type='prop'
  INNER JOIN Teacher-narrowPred AS Teacher1_name
    ON Teacher1.id = Teacher1_name.id AND
    Teacher1_name.type'prop'
```

Exemplary technique 25 for answering SPARQL queries containing optional relationships and properties is described herein.

Technique 25 builds on Technique 10, to allow the DPA to generate an SQL query reliant on the RDF representational schema described in technique 23. While the described techniques build on technique 24, a similar modification could be made to any of techniques 12-16.

Technique 25 may include the same steps as technique 25, but with follow modifications. Every concept instance has a subquery in which a reduced (e.g., SELECT DISTINCT) to allow a list of unique concept instance identifiers to be joined by the DPA to a copy of the concept instance table according to relationships, with LEFT/INNER joins enforcing optionality. Each one of these subqueries returns at least one row for every unique instance of the concept identifier and columns indicating the presence of relation property data (which may be missing if it is optional). Relation connections are then handled by the DPA as join conditions between these subqueries. Table joins for literal properties are handled by the DPA as described in techniques except they are changed to LEFT joins with additional filters if non-optional.

The 25th technique may be implemented by following steps performed by the DPA.

1. The DPA builds list "queryRelations" of all relations in query, with the name of the relation property and the identifiers for the subject and object concept instances.
2. The DPA, for each concept instance in the query, creates a subquery in the FROM clause of the top-level query, referenced by the concept type label (e.g., Student) and aliased by the concept instance identifier (e.g., Student1). In the FROM clause of this subquery, the DPA adds a SELECT DISTINCT query on the concept table returning only the concept instance identifier column.
3. For each relation (including the case where there are none) connected to this concept instance, the DPA connects another instance of the concept table to the FROM clause with an INNER, LEFT or RIGHT JOIN appropriate to the direction of optionality in the relationship, and add a JOIN condition based on the relationship similar to techniques 24 including the type column. Alias each of these table joins, and add type, property name and property value columns to the concept instance level subquery.
4. If that concept instance is not the first instance added to the query FROM clause, the DPA appends a LEFT JOIN clause.
5. The DPA, from a list of all previously added concept instances (and thus table aliases), constructs a filter condition for the INNER JOIN clause, combining with AND as appropriate.
6a. To determine the exact filter conditions for the INNER JOIN, the DPA examines the queryRelations list to determine the directionality of the relation between the two concept instances.
6b. Based on the direction of optionality in the relation, the DPA adds WHERE filter conditions as appropriate.
7. The DPA adds the concept instance to a list of previously visited concept instances.
8. For each literal property for this concept instance in the semantic query, the DPA adds a table instance to the FROM clause, aliasing each with the concept instance identifier plus the property identifier.
9. The DPA append a LEFT JOIN clause with filter conditions connecting the property table alias to the corresponding concept instance relation alias, by concept instance id.
10. Further, the DPA adds a filter condition to the LEFT JOIN limiting the property table alias to rows where the property identifier matches the required literal property from the semantic query. When specifying the literal property in these join conditions, the DPA specifies the "type" column has the value indicating a relation property (e.g., type="r" in some implementations)
11. For all literal properties of the concept instance, the DPA adds them to the SELECT clause, aliased with the concept instance and property label.
12. For any filters on each property, the DPA adds them to the WHERE clause.
13. The DPA combines SELECT, FROM and WHERE clauses into a complete SQL query.

Exemplary technique 17 for translating knowledge model concepts into table schema is described herein.

The 17th technique may be used by the DPA as part of any of the methods defined for creating and managing triple store (e.g., RDF) schema representation, query translation, and data loading (e.g., as shown in FIG. 3). Concept identifiers in knowledge graphs may be specified by the DPA as URLs, whether globally addressable or not. These url strings may be, ore complex beyond the simplified examples used here (e.g., Student, Teacher concepts showing in FIGS. 6 and 7. Hashes of the URLs may be created by the DPA and used as table names. Alternately, the url can be parsed by the DPA for significant sub-strings to recombine into legal table names. Alternately, a simple lookup table can be managed by the DPA to relate URLs to simple table name strings.

Example of the DPA performing URL parsing for recombination into legal table name is provided below:

```
ciTable = tenantId + '-' + ci_details['uri'].split('/')[-1].split('#')[0] + '-' + ci_details['typeLabel']
```

Exemplary technique 18 for loading RDF data over a Cloud Analytical Data Store—"Bulk Load" is described herein.

Data may be received by the DPA in an RDF representation via the interface service. Subject data may be parsed by the DPA to identify a concept, to determine its placement in schema. This technique may be used by the DPA for bulk load data (e.g., from loaded triples) into RDF storage scheme, for example as show in FIG. 4. The technique offers opportunities for performance enhancement and resource reduction versus individual one-triple-at-a-time insert strategy.

Technique 18 may be performed by the following steps performed by the DPA.
1. Triple Store (e.g., Turtle, RDF/XML, or RDF) data file is received by the loading service of the DPA.
2. File is processed by the DPA one line at a time (e.g., one triple at a time).
3. For some types of file format (Turtle with PREFIX or BASE definitions) determination of semantic concept for each Subject in the triple can be optimized by the DPA without parsing every line. In other embodiments, the Subject column of each line is parsed by the DPA to determine the concept.
4. Internal memory representations (lists of 3-tuples) are created by the DPA to store triples separately for each concept.
5. In one approach, a maximum batch size may be preconfigured by the DPA. When an in-memory list of triples reaches this limit within the loading service, the data is inserted into the schema tables. The specifics of this operation may depend on the triple store schema being used, and may require parsing of predicates to identify the appropriate column for insertion.
6. Where the underlying CADS technology provides an optimized batch load capability (commonly via csv file) this can be used by the DPA. In another embodiment, individual triples can be processed by the DPA using SQL INSERT/UPDATE commands, or the other suitable commands.

Technique 18 may use following example triple data (e.g., in turtle format):

```
BASE <http://example />
<Student#S4> <Student/Name> "Steve".
<Student#S4> <Student/Age> "10".
<Student#S4> <Student/Grade> "4".
<Student#S4> <Student/Name> <Teacher#T678>.
<Teacher#T678> <Teacher/Name> "Snell".
```

Exemplary technique 19 for loading RDF data over a Cloud Analytical Data Store—"SPARQL INSERT" is described herein.

Technique 19 may extend technique 18. For example, support for loading RDF files can be extended by the DPA accepting SPARQL "INSERT DATA" queries, while still retaining CADS-native bulk loading capabilities. SPARQL "INSERT DATA" queries can be identified at the SPARQL interface service of the DPA, and processed separately from SPARQL "SELECT" query answering requests. Data from the DATA clause can be extracted and treated as Turtle format shown above, and fed as a batch to the bulk load service from technique 18.

Technique 19 may use following query (e.g., in SPAQRL format using data from FIGS. 6 and 7):

```
PREFIX p: < http://example />
INSERT DATA
{
p:Student#S4 p:Student/Name "Steve".
p:Student#S4 p:Student/Age "10".
p:Student#S4 p:Student/Grade "4".
p:Student#S4 p:Student/Name p:Teacher#T678.
p:Teacher#T678 p:Teacher/Name "Snell".
}
```

Technique 19 Retains CADS native bulk loading features (where available) for SPARQL INSERT DATA queries.

Exemplary technique 26 for loading RDF data over a Cloud Analytical Data Store—"Bulk Load leveraging CADS Capabilities" is described herein.

Technique 26 may be used by the DPA to further extend techniques 18 and 19. Technique 26 may include the following elements. As an additional step, RDF data can be ingested by the DPA into a CADS staging table temporarily. This allows RDF files to be read by the DPA in bulk (faster) and not to be parsed one line at a time. This allows for the DPA parsing of Subject type to be done on CADS compute instead of "in memory" as referenced in technique 18. This allows for the DPA to use the MERGE capability of modern Data Warehouse and Data Lakehouse products to make targeted changes to schema tables without duplication or interruption of query service. This method further allows elimination of Batch Size concepts from techniques 18, and since all schema methods have separate tables per concept, it can be parallelized completely by the DPA with a MERGE statement per concept.

Exemplary technique 27 for loading RDF data over a Cloud Analytical Data Store—"SPARQL INSERT with Lull Detection" is described herein.

Technique 27 may be used by the DPA to extend technique 19 and include the following elements. Due to the overhead persisting data to a CADS, processing each individual INSERT query may be suboptimal. It may be better for the DPA to wait until a specific "job" or "workflow" has completed (e.g., a large number of INSERT queries that are related) to run one batch of the bulk ingest process identified in technique 18 and elaborated in technique 26. Without outside orchestration (e.g., workflow "start" and "end" signals from an external system, which may break support for a standard data paradigm) the DPA can instead monitor patterns in INSERT query traffic. In one approach, the DPA can buffer incoming queries, up to a specific batch size (number of queries) and/or a maximum latency (5 minutes) and only process that batch when a "lull" in the input is detected. In some embodiments, the DPA simply monitor for the buffer being empty of new queries for some period of time (e.g., 1 second). This technique addresses agile data management (e.g., single INSERT queries) without breaking the ability for a large-scale CADS to handle large ingestion "jobs" consisting of man (e.g., millions) of INSERT queries.

Exemplary technique 28 for managing knowledge graph-driven schema changes for an RDF representation over a Cloud Analytical Data Store—Knowledge Graph Sharing is described herein.

Technique 28 may allow the DPA to extend technique 19 and include the following elements. As an alternative to technique 27, the DPA may provide an opportunity for outside systems (data providers) to indicate to start and end of INSERT query patterns. An interface method is provided by the DPA to allow outside systems to dictate any deletion of data required prior to loading new data. An interface method is provided by the DPA allowing outside systems to indicate that they are done sending data matching a specific identifier (this identifier may be a unique string embedded in file names of input files).

Exemplary technique 20 for managing knowledge graph-driven schema changes for an RDF representation over a Cloud Analytical Data Store—Knowledge Graph Sharing is described herein. Technique 20 may allow the DPA to support any of the triple store representation techniques 4-8 by creating tables hold data. Their configuration (e.g., clustering) may be set, and in some cases their column schema may be modified over time (e.g., in "wide" schemas as columns are added).

Figure 14:
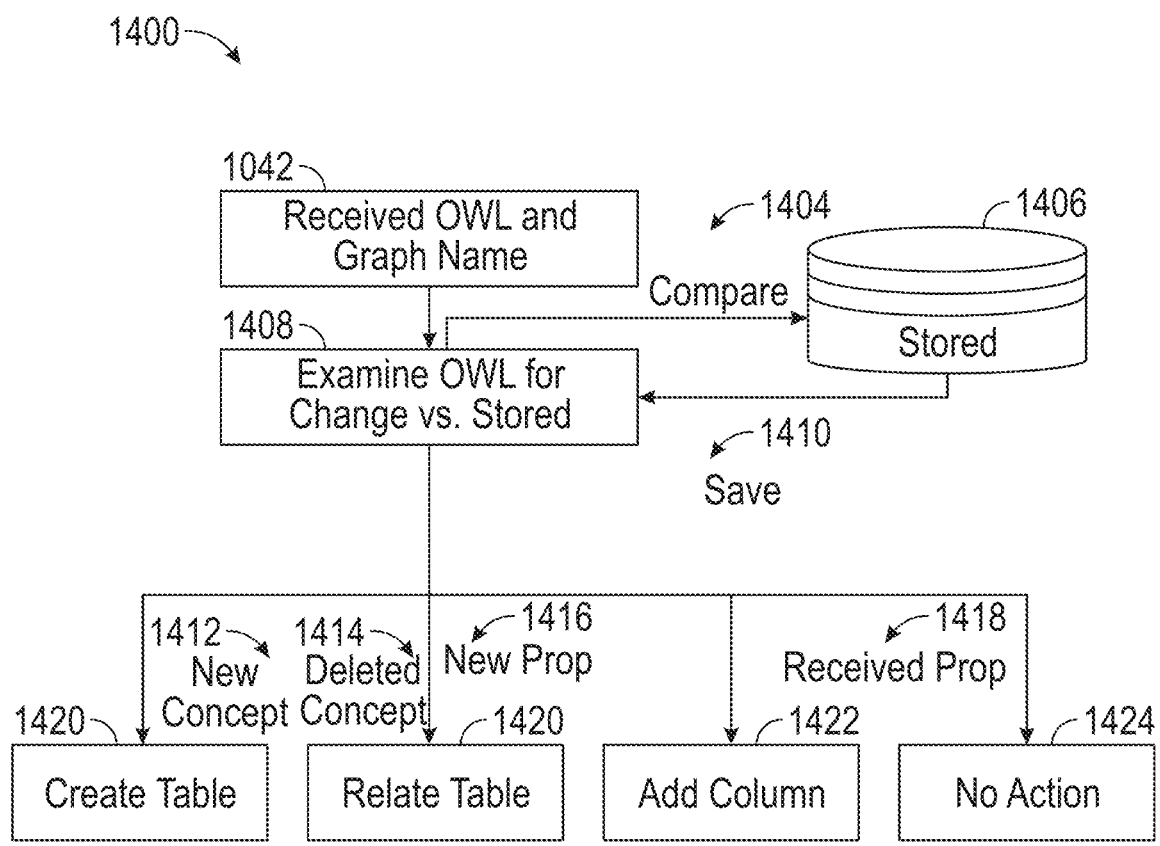
FIG. 14 shows an exemplary flowchart for data processing, in accordance with some embodiments of the disclosure.

FIG. 14 illustrated exemplary flowchart 1400 used by the DPA to perform schema management (e.g., as shown in FIG. 3). In the shown example, OWL data and graph name are received by the DPA 1042. The changes are compared 1404 by the DPA to stored data 1406 to Examine OWL for changes vs. Stored data 1408. As a result, the DPA may perform one or more actions: create a new table 1420 to handle a new concept 1415, relate a table 1420 to handle deletion of concept 1414, (add a Column 1422 to handle a new property), or refrain from action 1424 when a property is received.

Technique 20 may provide the following features performed by the DPA. a knowledge graph update interface service of the DPA may accept a representation of a knowledge model (e.g., OWL or RDFS specification of the knowledge model as shown in FIGS. 6 and 7). The knowledge graph update interface service of the DPA may also accept the URL of a named graph in which to store data (separate from data linked to other knowledge graph instances, or even multiple instances of the same knowledge graph). The knowledge graph representation can be parsed by the DPA to identify all concepts in the graph, so a table can be created for each. Where concepts are identified by Internationalized Resource Identifiers (IRIs), the method for resolving them to legal table names (technique 17) can be used by the DPA. In another embodiment, the IRI for the named graph may be resolved by the DPA using technique 17, and concatenated with each table name to provide uniqueness across named graphs containing a similarly named concept. Every time the knowledge graph update service is called by the DPA, the DPA may store internally the knowledge graph definition for each named graph. Upon subsequent calls, the state of the knowledge graph can be compared by the DPA for changes.

Example RDFS knowledge graph representation (e.g., in Turtle) is provide below based on data from FIGS. 6 and 7.

```
@prefix rdf: < 1999/02/22-rdf-syntax-ns#>.
@prefix rdfs: < /2000/01/rdf-schema#>.
@prefix eg: < http://example>.
```

-continued

```
ex:Student rdf:type rdfs:Concept.
ex:Teacher rdf:type rdfs:Concept.
ex:Teacher#Name rdf:type rdfs:Property.
ex:Teacher#Name rdfs:domain ex:Teacher.
ex:Student#taught_by rdf:type rdfs:Property.
ex:Student#taught_by rdfs:domain ex:Student.
exStudent#taught_by rdfs:range ex:Teacher
```

Example Table creation code in SQL is provided below.

```
CREATE OR REPLACE TABLE Student_narrow (id string,
   prop string, value string)
CLUSTER BY (id);
```

Example adding a column in SQL is provided below.

ALTER TABLE Student_wide ADD COLUMN Grade string;

Exemplary technique 21 for managing knowledge graph-driven schema changes for an RDF representation over a Cloud Analytical Data Store—Dynamic is described herein.

Technique 21 may allow the DPA to perform a modification of technique 20 with differences described herein. For Example, instead of providing a representation of the Knowledge Graph, the DPA may automatically detect the concepts represented in loaded data. In this approach, this augments technique 26, where the interim staged copy of input data is already being analyzed by the DPA for subject concepts to facilitate insertion into the schema. As an additional step, the DPA may check to see if the required schema actually exists, and if not pause to create it before continuing. Any delay involved is only incurred by the DPA the first-time new data is seen.

Exemplary technique 22 for publishing SPARQL queries to native objects over a Cloud Analytical Data Store is described herein.

Technique 22 may be used by the DPA to allow translation into native CADS query such that it may be published for use outside of semantic tool chain (e.g., as shown in FIG. 2). When performing techniques 9-6, SPARQL queries are converted by the DPA into CADS native queries so that results can be returned by the DPA via the SPARQL service. Most CADS systems used by the DPA may have a method to persist queries as tabular objects. The DPA may add a "publish" flag to the SPARQL interface service, such that queries can be persisted in these native objects instead of returning the data. The persisted objects may be tabular and allow access to query data for integration into larger CADS native queries. For a Corporate Data Warehouse (CDW) using SQL, these objects may be created by the DPA take the form of VIEW's. Once created, query results can be integrated into other SQL queries (bypassing the need to merge the SQL pattern and SPARQL-service pattern, and whatever performance impact that may have) via, for example, JOIN constructions.

Technique 22 may include the following steps performed by the DPA. The DPA may sending SPARQL query to Publish interface service, also providing a name for the published object. The DPA may internally call SPARQL service with "publish" flag set which returns native query code instead of results. The DPA may using schema DDL native to the CADS to create the persisted object.

Technique 22 may be used by the DPA to create a view using the following SQL statement:

```
CREATE VIEW MyQueryName AS
SELECT Student1.name Student1_name, Teacher1.name
Teacher1_name
FROM Student-wide AS Student1
INNER JOIN Teacher-wide AS Teacher1
ON Student1.taught_by = Teacher1.id
```

Figure 15A:
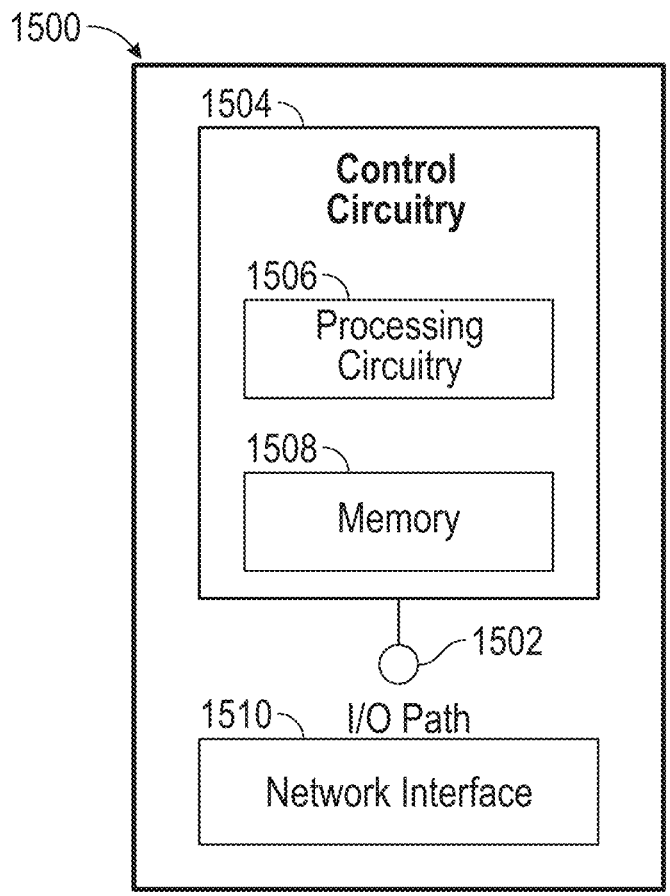
FIG. 15A shows a diagram of an illustrative device for performing data processing, in accordance with some embodiments of the disclosure.

FIG. 15A shows a generalized embodiment of a device usable to provide data processing capabilities as described above and below. In particular, device 1500 of FIG. 15A may be any of the devices that perform steps described in FIGS. 1-14 and 16. Device 1500 may receive data via data network interfaces 1510 and provide the received data to control circuitry 1504 via an input/output (I/O) path 1502. Control circuitry 1504 includes processing circuitry 1506 and storage 1508. Storage 1508 may include volatile memory 1530 (such as random-access memory (RAM), for example, static RAM and/or dynamic RAM), which does not retain its contents when power is turned off, and non-volatile memory 1508 (such as, for example, a solid-state drive (SSD), a hard disk drive (HDD), electrically erasable programmable read-only memory (EEPROM), etc.), which does retain its contents when power is turned off. Control circuitry 1504 may send and receive commands, requests, and other suitable data using I/O path 1502. As noted above, I/O path 1502 connects control circuitry 1504 (and specifically processing circuitry 1506) to network interface 1510, which in turn connects device 1500 to one or more other devices. For example, I/O path 1502 may be used by one or more servers to received local or remote user interface input and provide visualization output to remote devices.

Control circuitry 1504 may be based on any suitable processing circuitry, such as processing circuitry 1506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 1504 executes instructions suitable to implement any of the techniques described above or below.

Storage 1508 may be an electronic storage device that is part of control circuitry 1504. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 1508 may include a set of instruction, that when executed by control circuitry 1504 result in execution and operation of the DPA as described by FIGS. 1-14 and 16. In some embodiments, device 1500 may comprise user interface circuitry for receiving user input (e.g., via keyboard, mouse, touch screen or any other suitable user input device). User interface circuitry may provide input data to control circuitry 1504.

Figure 15B:
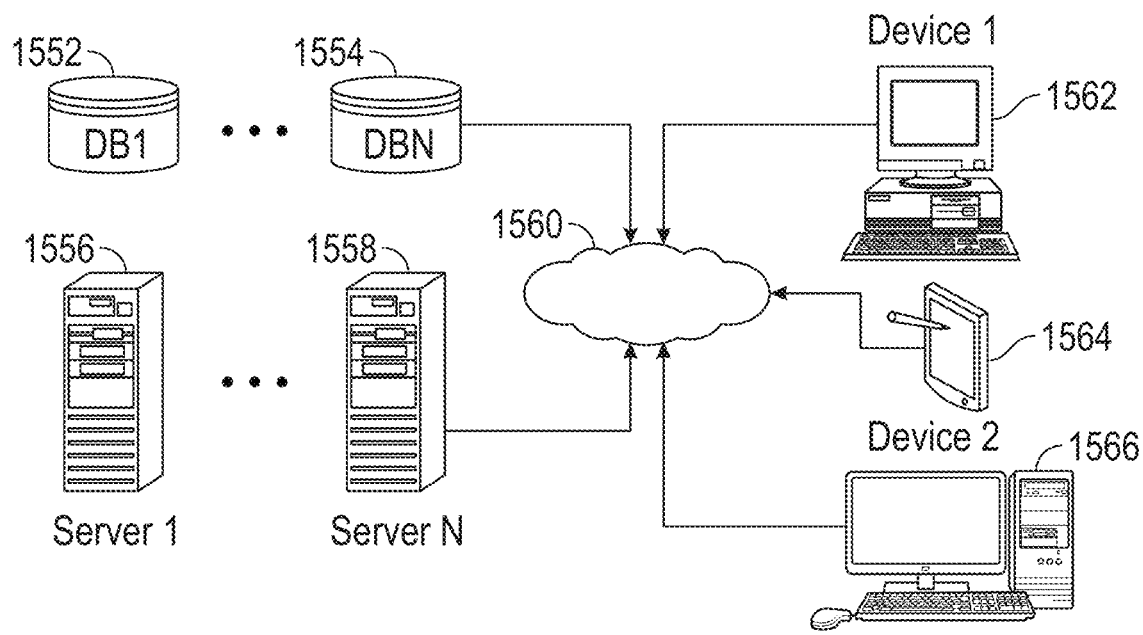
FIG. 15B shows a diagram of an illustrative system for performing data processing, in accordance with some embodiments of the disclosure.

FIG. 15B shows a diagram of an illustrative system 1550 for performing data analysis, in accordance with embodiments described in FIGS. 1-8. For example, system 1550 includes any number of servers 1556-1558 that may be configured to perform all aspects of the DPA as described as above and below. For example, the DPA may be executed by any of the servers 1556-1558 or by a combination of servers using suitable distributed computing techniques. Servers 1556-1558 may be communicatively connected to any number of databases 1552-1554 by local connection or via network 1560. Network 1560 may be any kind of a suitable network, such as Internet, intranet, private network, virtual network, cellular network, or any combination the above.

System 1550 may include any number of client devices 1562-1566 (e.g., PCs, computers, smartphones, laptops, PDA, or any other suitable computer devices). Client devices 1562-1566 may be configured to interface with servers 1556-1558 via network 1560. Client devices 1562-1566 may be configured to provide UI input to servers 1556-1558, e.g., to define the semantic overlay data structure for tadeonal data sources (e.g., stored on Databases 1552-1554). Client devices 1562-1566 may be configured to provide query input to the DPA executing on servers 1556-1558. Client devices 1562-1566 may be configured to received output provided the DPA executing on servers 1556-1558. For example, client devices 1562-1566 may display interfaces and query results provided the DPA generated for display by servers 1556-1558 via network 1560. Each of devices 1562-1566, 1556-1558, and 1552-1554 may comprise hardware as shown by FIG. 15A and/or any other suitable hardware.

Figure 16:
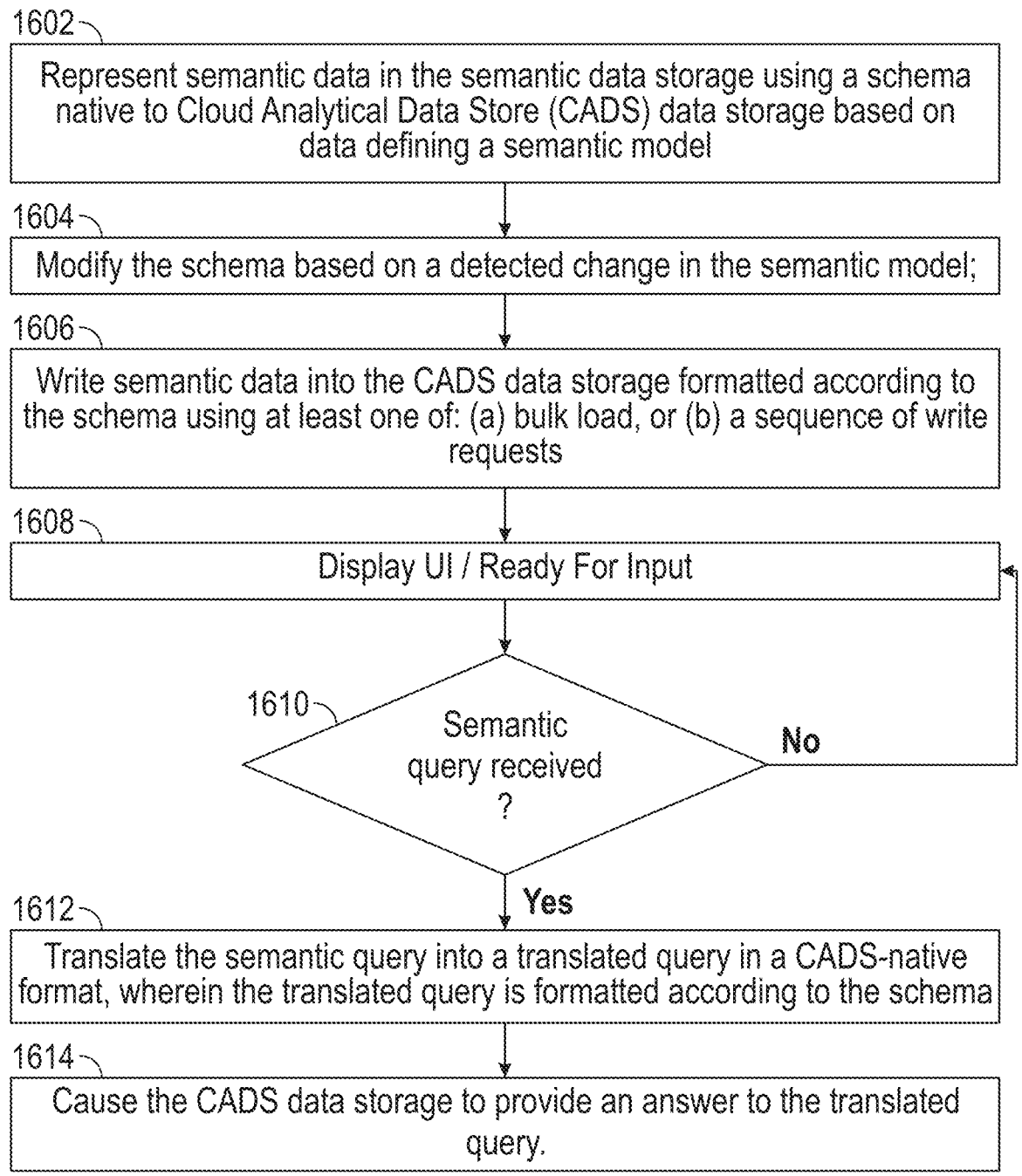
FIG. 16 shows an exemplary flowchart for data processing, in accordance with some embodiments of the disclosure.

FIG. 16 is a flowchart of method 1600 for data processing, in accordance with some embodiments of the present disclosure. Process 1600 may be performed by physical or virtual control circuitry, such as control circuitry 1504 of device 1500 of FIG. 15A or any of devices 1556-1558 of FIG. 15B.

At 1602, the control circuitry of one of the servers (e.g., control circuitry of 1504 one of servers 1556-1558) may access semantic data in the semantic data storage (e.g., triple store data stored as shown in FIG. 8) that is stored on one or more of the servers 1556-1558. The control circuitry may then represent semantic data in the semantic data storage using a schema native to Cloud Analytical Data Store (CADS) data storage based on data defining a semantic model and store the representation, e.g., in transitory or non-transitory memory 1508.

At 1604, the control circuitry modifies the schema based on a detected change in the semantic model. Exemplary embodiments of such modifications by the DPA are describe above in relation to techniques 1-28.

At 1606, the control circuitry writes semantic data into the CADS data storage formatted according to the schema using at least one of: (a) bulk load, or (b) a sequence of write requests.

At 1608 the control circuitry displays a user interface (e.g., via user interface circuitry of device 1500) for running queries over the CADS data storage. In some embodiments, the query may be a triple-store compatible language query (e.g., SPARQL). At 1610 the control circuitry checks if the query is received, if not the monitoring continues at 1608. If the query is received the process continues at 1612.

At 1612 the control circuitry translates the semantic query into a translated query in a CADS-native format, wherein the translated query is formatted according to the schema. Such translations are described above in relation to techniques 1-28.

At 1614 the control circuitry causes the CADS data storage to provide an answer to the translated query. The answer may be display, e.g., using input/output circuitry 1502

While the process 1600 is described above illustrate a single iteration of the operations to analyze data and display results on a user interface, those skilled in the art will appreciate that these processes may be iteratively repeated. The process 1500 described above is intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any suitable other embodiment herein, and flowcharts or examples relating to one embodiment may be combined with any other suitable embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that systems and methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device, having a computer-readable program code stored thereon. It should also be understood that methods, techniques, and processes involved in the present disclosure may be executed using processing circuitry.

What is claimed is:

1. A method comprising:
   representing semantic data in the semantic data storage using a schema native to Cloud Analytical Data Store (CADS) based on data defining a semantic model;
   modifying the schema based on a detected change in the semantic model, by:
     performing a selection of one of (a) narrow strategy schema, or (b) wide strategy schema based on metadata of the CADS data storage and/or based on optimization methods native to the CADS data storage; and
     modifying the schema based on the performed selection;
   writing semantic data into the CADS, wherein the semantic data is formatted according to the schema using at least one of: (a) bulk load, or (b) a sequence of write requests;
   receiving a semantic query;
   translating the semantic query into a translated query in a CADS-native format, wherein the translated query is formatted according to the schema; and
   causing the CADS to provide an answer to the translated query based on data contained in the CADS.

2. The method of claim 1 wherein the CADS comprises a compute portion and a data store portion, and wherein causing the CADS to provide the answer to the translated query compromises causing the compute portion of CADS to provide the answer based on data contained in the data store portion of the CADS.

3. The method of claim 1, where semantic data storage is a triple store storage.

4. The method of claim 3, wherein the semantic data storage is a Resource Description Framework (RDF) semantic data storage, and wherein the semantic query is a SPARQL Protocol and RDF Query Language (SPARQL) query.

5. A method of claim 1, further comprising:
   receiving a second semantic query;
   translating the second semantic query into a second translated query in a CADS-native format, wherein the second translated query is formatted according to the schema;
   publishing the second translated semantic query as a tabular object native to the CADS data storage; and
   providing an interface that allows for running the second translated semantic query over the CADS data storage.

6. The method of claim 1, wherein the schema comprises at least one of clustering or segmenting strategy.

7. The method of claim 1, wherein:
   selection of the narrow strategy schema, results in each concept in the semantic model being represented by a unique table, wherein each of the unique tables comprises three columns, wherein:
     (a) first column comprises a concept instance identification (ID);
     (b) second column comprises a property name for the concept instance associated with the concept instance; and
     (c) third column comprises a value associated with the property name and the concept instance ID; and
   wherein selection of the wide schema, results in each concept in the semantic model being represented by a unique table, wherein the table comprises multiple columns, each column being associated with a different property for a concept instance ID.

8. The method of claim 7, wherein one column of the multiple columns comprises an identifier for each instance of the concept, and other columns the multiple columns are associated with a different property of the concept.

9. The method of claim 1, wherein each of the unique tables comprises four columns, wherein the fourth column indicates whether property is unitary property or a relational property.

10. A system comprising:
    control circuitry configured to:
      represent semantic data in the semantic data storage using a schema native to Cloud Analytical Data Store (CADS) based on data defining a semantic model;
      modify the schema based on a detected change in the semantic model, by:
        performing a selection of one of (a) narrow strategy schema, or (b) wide strategy schema based on metadata of the CADS data storage and/or based on optimization methods native to the CADS data storage; and
        modifying the schema based on the performed selection;
      write semantic data into the CADS, wherein the semantic data is formatted according to the schema using at least one of: (a) bulk load, or (b) a sequence of write requests;

input/output circuitry configured to:
receiving a semantic query;
wherein the control circuitry is further configured to:
translate the semantic query into a translated query in a CADS-native format, wherein the translated query is formatted according to the schema; and
cause the CADS to provide an answer to the translated query based on data contained in the CADS.

11. The system of claim 10 wherein the CADS comprises a compute portion and a data store portion, and wherein the control circuitry is further configured to cause the CADS to provide the answer to the translated query by causing the compute portion of CADS to provide the answer based on data contained in the data store portion of the CADS.

12. The system of claim 10, where semantic data storage is a triple store storage.

13. The system of claim 12, wherein the semantic data storage is a Resource Description Framework (RDF) semantic data storage, and wherein the semantic query is a SPARQL Protocol and RDF Query Language (SPARQL) query.

14. A system of claim 10,
wherein the input/output circuitry is further configured to:
receiving a second semantic query; and
wherein the control circuitry is further configured to:
translate the second semantic query into a second translated query in a CADS-native format, wherein the second translated query is formatted according to the schema;
publish the second translated semantic query as a tabular object native to the CADS data storage; and
provide an interface that allows for running the second translated semantic query over the CADS data storage.

15. The system of claim 10, wherein the schema comprises at least one of clustering or segmenting strategy.

16. The system of claim 10, wherein: selection of the narrow strategy schema, results in concept in the semantic model being represented by a unique table, wherein each of the unique tables comprises three columns, wherein:
(a) first column comprises a concept instance identification (ID);
(b) second column comprises a property name for the concept instance associated with the concept instance; and
(c) third column comprises a value associated with the property name and the concept instance ID; and
wherein selection of the wide schema, results in each concept in the semantic model being represented by a unique table, wherein the table comprises multiple columns, each column being associated with a different property for a concept instance ID.

17. The system of claim 16, wherein one column of the multiple columns comprises an identifier for each instance of the concept, and other columns the multiple columns are associated with a different property of the concept.

18. The system of claim 10, wherein each of the unique tables comprises four columns, wherein the fourth column indicates whether property is unitary property or a relational property.

* * * * *